United States Patent
Yang et al.

(10) Patent No.: US 12,457,562 B2
(45) Date of Patent: Oct. 28, 2025

(54) COMMUNICATION FOR VEHICULAR DEVICE

(71) Applicant: LG ELECTRONICS INC., Seoul (KR)

(72) Inventors: Yoonoh Yang, Seoul (KR); Ilnam Cho, Seoul (KR); Sangwook Lee, Seoul (KR); Byeongyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 431 days.

(21) Appl. No.: 18/008,869

(22) PCT Filed: Jun. 18, 2021

(86) PCT No.: PCT/KR2021/007677
§ 371 (c)(1),
(2) Date: Dec. 7, 2022

(87) PCT Pub. No.: WO2021/261847
PCT Pub. Date: Dec. 30, 2021

(65) Prior Publication Data
US 2023/0224823 A1    Jul. 13, 2023

(30) Foreign Application Priority Data
Jun. 26, 2020   (KR) .................. 10-2020-0078680

(51) Int. Cl.
*H04W 52/26* (2009.01)
*H04B 7/06* (2006.01)
(Continued)

(52) U.S. Cl.
CPC ...... *H04W 52/265* (2013.01); *H04B 7/06966* (2023.05); *H04W 52/146* (2013.01); *H04W 52/367* (2013.01)

(58) Field of Classification Search
CPC ............ H04W 52/265; H04W 52/146; H04W 52/367; H04W 52/36; H04W 52/22
See application file for complete search history.

(56) References Cited

U.S. PATENT DOCUMENTS

| | | | |
|---|---|---|---|
| 2018/0049207 A1* | 2/2018 | Lim | H04W 72/0453 |
| 2021/0067391 A1* | 3/2021 | Sengupta | H04L 27/2614 |
| 2022/0312481 A1* | 9/2022 | Talarico | H04L 1/187 |

FOREIGN PATENT DOCUMENTS

WO   2019158461   8/2019

OTHER PUBLICATIONS

Samsung, Discussion on new FR2 FWA UE, R4-2006432, 3GPP TSG RAN WG4 Meeting #95-e, Electronic Meeting, May 15, 2020, sections 2.1-2.3.

(Continued)

*Primary Examiner* — John J Lee
(74) *Attorney, Agent, or Firm* — BRYAN CAVE LEIGHTON PAISNER LLP

(57) ABSTRACT

There is provided a UE in a wireless communication system, the UE comprising: at least one transceiver; at least one processor; and at least one computer memory operably connectable to the at least one processor and storing instructions that, based on being executed by the at least one processor, transmitting uplink signal to a base station, wherein power class of the UE is power class X, based on that the UE is a vehicular UE configured to use an operating band including frequency range around 60 GHz, wherein the at least one transceiver is configured to satisfy a RF requirement for the power class X, and wherein the RF requirement for the power class X includes at least one of minimum peak EIRP, maximum output power, or spherical coverage.

11 Claims, 26 Drawing Sheets

(51) Int. Cl.
*H04W 52/14* (2009.01)
*H04W 52/36* (2009.01)

(56) References Cited

OTHER PUBLICATIONS

NTT Docomo, Inc., How to Introduce FR2 new power class feature, R4-2004429, 3GPP TSG-RAN WG4 Meeting #94-e-bis, Electronic Meeting, Apr. 10, 2020, section 2.
5G; NR; User Equipment (UE) radio transmission and reception, part 2, range 2 standalone, ETSI TS 138 101-2 V15.2.0, Jul. 2018, section 6.2.
3GPP TS 38.101-2 V16.3.1: Section 6.2, Apr. 9, 2020.
3GPP TS 38.306 V15.9.0: Section S4.2.7, Apr. 6, 2020.

* cited by examiner

FIG. 7

|  | Unit | V2V | | | | | |
|---|---|---|---|---|---|---|---|
| Distance | m | 100 | 200 | 300 | 500 | 700 | 1000 |
| Bandwidth | MHz | 50 | | | | | |
| Noise Floor | dBm | -87 | | | | | |
| Target SNR | dB | 6 | | | | | |
| Wanted Rx Signal Level @ RF | dBm | -81 | | | | | |
| Rx Antenna gain (Grx = Realized antenna array gain + polarization gain(2.5)) | dBi | 15   18   21 | | | | | |
| IL | dB | 7 | | | | | |
| Wanted Rx Signal Level @ Air | dBm | -89   -92   -95 | | | | | |
| PL | dB | 108 | 114 | 118 | 122 | 125 | 128 |
| Oxygen Attenuation | dBm | 1 | 2 | 3 | 5 | 7 | 10 |
| Required EIRP | dBm | 20  17  14 | 27  24  21 | 32  29  26 | 38  35  32 | 43  40  37 | 49  46  43 |
| Note: Numbers highlighted in a same way are used for a same pair. | | | | | | | |

FIG. 9

|  | Unit | V2V | | | | | |
|---|---|---|---|---|---|---|---|
| Distance | m | 100 | 200 | 300 | 500 | 700 | 1000 |
| Tx Antenna gain (Grx = Realized antenna array gain + polarization gain(2.5)) | dBi | 15 | | | | | |
| Implementation Loss(IL) | dB | 8 | | | | | |
| Tx Power | dB | 13 | 20 | 25 | 31 | 36 | 42 |
| Required EIRP(Gtx=15dBi) | dBm | 20 | 27 | 32 | 38 | 43 | 49 |
| Tx Antenna gain (Grx = Realized antenna array gain + polarization gain(2.5)) | dBi | 18 | | | | | |
| Implementation Loss(IL) | dB | 8 | | | | | |
| Tx Power | dB | 7 | 13 | 19 | 25 | 30 | 36 |
| Required EIRP(Gtx=18dBi) | dBm | 17 | 23 | 29 | 35 | 40 | 46 |
| Tx Antenna gain (Grx = Realized antenna array gain + polarization gain(2.5)) | dBi | 21 | | | | | |
| Implementation Loss(IL) | dB | 8 | | | | | |
| Tx Power | dB | 1 | 8 | 13 | 19 | 24 | 30 |
| Required EIRP(Gtx=21dBi) | dBm | 14 | 21 | 26 | 32 | 37 | 43 |

FIG. 10

|  | Unit | Related requirements | | | | | |
|---|---|---|---|---|---|---|---|
| Distance | m | 300 | 200 | 300 | 400 | 300 | 800 |
| EIRP | dBm | 32 | 28 | 29 | 34 | 26 | 40 |
| Tx Power | dBm | 25 | 21 | 19 | 24 | 13 | 27 |
| Pout per element | dBm | 16 | 12 | 7 | 12 | -2 | 12 |
| # of antennas in array | | 8 | | 16 | | 32 | |
| Tx Antenna gain | dBi | 15 | | 18 | | 21 | |
| Avg.antenna element gain | dBi | 4.5 | | | | | |
| antenna roll-off loss vs frequency | dB | -1 | | | | | |
| Realized antenna array gain | dBi | 12.5 | | 15.5 | | 18.5 | |
| Polarization gain | dB | 2.5 | | | | | |
| IL | dB | 8 | | | | | |

FIG. 11

| | Unit | Related requirements | | | | | |
|---|---|---|---|---|---|---|---|
| Distance | m | 300 | 200 | 300 | 320 | 300 | 500 |
| EIRP | dBm | 32 | 28 | 29 | 31 | 26 | 34 |
| Tx Power | dBm | 25 | 21 | 19 | 21 | 13 | 21 |
| Pout per element | dBm | 16 | 12 | 10 | 12 | 4 | 12 |
| # of antennas in array | | 8 | | | | | |
| Tx Antenna gain | dBi | 15 | | 18 | | 21 | |
| Avg.antenna element gain | dBi | 4.5 | | 7.5 | | 10.5 | |
| antenna roll-off loss vs frequency | dB | -1 | | | | | |
| Realized antenna array gain | dBi | 12.5 | | 15.5 | | 18.5 | |
| Polarization gain | dB | 2.5 | | | | | |
| IL | dB | 8 | | | | | |

FIG. 13

| Parameter | Unit | Case I | Case II | Case III |
|---|---|---|---|---|
| Pout per element | dBm | 16 | 12 | 12 |
| # of antennas in array | | 8 | 16 | 8 |
| Total conducted power per polarization | dBm | 25 | 24 | 21 |
| Avg. antenna element gain | dBi | 4.5 | 4.5 | 7.5 |
| Antenna roll-off loss vs frequency | dB | -1 | | |
| Realized antenna array gain | dBi | 12.5 | 15.5 | 15.5 |
| Polarization gain | dB | 2.5 | | |
| Mismatch and transmission line loss including load pull | dB | -2.5 | | |
| Beam forming loss(phase shifter and amplitude error) | dB | -0.5 | | |
| Finite beam table | dB | -0.25 | | |
| Beam forming loss(one beam table fits all) | dB | -0.25 | | |
| Form-factor integration losses | dB | -4.5 | | |
| Total implementation loss(worst-case) | dB | -8 | | |
| Peak EIRP(Minimum) | dBm | 32 | 34 | 31 |

FIG. 14

| Parameter | Unit | Case Ia | Case IIa | Case IIIa |
|---|---|---|---|---|
| Pout per element | dBm | 4.5~7 | 4.5~7 | 4.5~7 |
| # of antennas in array |  | 8 | 16 | 8 |
| Total conducted power per polarization | dBm | 13.5~16 | 16.5~19 | 13.5~16 |
| Avg. antenna element gain | dBi | 4.5 | 4.5 | 7.5 |
| Antenna roll-off loss vs frequency | dB | -1 | | |
| Realized antenna array gain | dBi | 12.5 | 15.5 | 15.5 |
| Polarization gain | dB | 2.5 | | |
| Mismatch and transmission line loss including load pull | dB | -2.5 | | |
| Beam forming loss(phase shifter and amplitude error) | dB | -0.5 | | |
| Finite beam table | dB | -0.25 | | |
| Beam forming loss(one beam table fits all) | dB | -0.25 | | |
| Form-factor integration losses | dB | -4.5 | | |
| Total implementation loss(worst-case) | dB | -8 | | |
| Peak EIRP(Minimum) | dBm | 20.5~23 | 26.5~29 | 23.5~26 |

FIG. 15
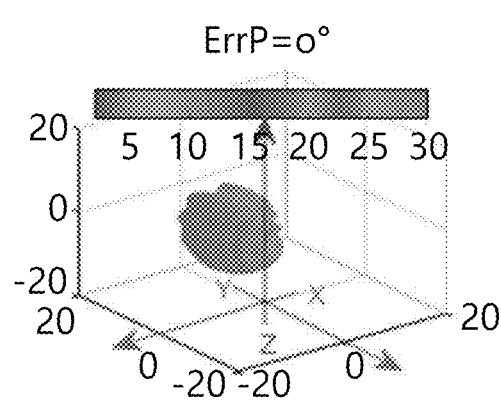
(a)
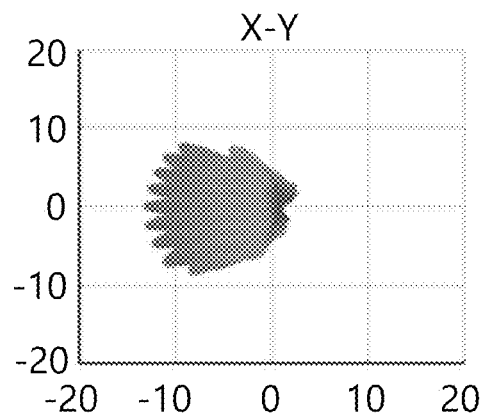
(b)
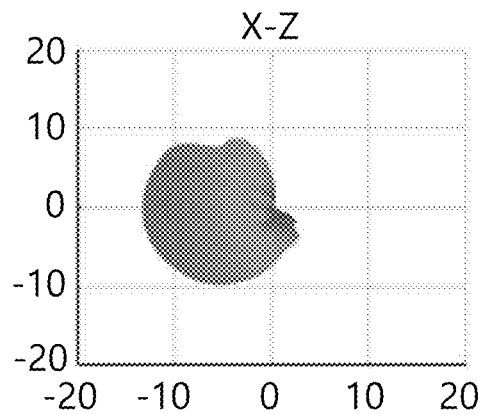
(c)
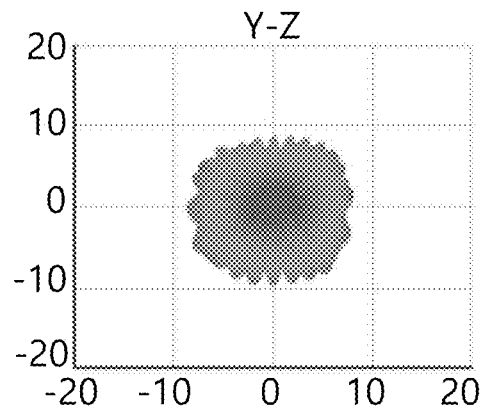
(d)

COMMUNICATION FOR VEHICULAR DEVICE

This application is the National Stage filing under 35 U.S.C. 371 of International Application No. PCT/KR2021/007677 filed on Jun. 18, 2021, which claims priority to Korean Patent Application No. 10-2020-0078680 filed on Jun. 26, 2020, the contents of which are all hereby incorporated by reference herein in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Recently, frequency range around 60 GHz (e.g. frequency range including 63 GHz) has been discussed to be used for communication based on NR. For example, a vehicular User Equipment (UE) may perform communication based on an operating band including the frequency range around 60 GHz.

However, conventionally, Radio Frequency (RF) requirements for the frequency band around 60 GHz (e.g. frequency band including 63 GHz) has not been defined. For example, RF requirements for transmission (e.g. vehicular UE RF transmit power requirement, beam correspondence, etc.) based on the frequency band around 60 GHz (e.g. frequency band including 63 GHz) is not defined.

SUMMARY

Accordingly, a disclosure of the present specification has been made in an effort to solve the aforementioned problem.

Accordingly, a disclosure of the present specification has been made in an effort to solve the aforementioned problem.

In accordance with an embodiment of the present disclosure, a disclosure of the present specification provides a UE in a wireless communication system, the UE comprising: at least one transceiver; at least one processor; and at least one computer memory operably connectable to the at least one processor and storing instructions that, based on being executed by the at least one processor, perform operations comprising: transmitting uplink signal to a base station, wherein power class of the UE is power class X, based on that the UE is a vehicular UE configured to use an operating band including frequency range around 60 GHz, wherein the at least one transceiver is configured to satisfy a RF requirement for the power class X, and wherein the RF requirement for the power class X includes at least one of minimum peak EIRP, maximum output power, or spherical coverage.

In accordance with an embodiment of the present disclosure, a disclosure of the present specification provides a method for performing communication, the method performed by a UE, the method comprising: transmitting uplink signal to a base station, wherein power class of the UE is power class X, based on that the UE is a vehicular UE configured to use an operating band including frequency range around 60 GHz, wherein at least one transceiver of the UE is configured to satisfy a RF requirement for the power class X, and wherein the RF requirement for the power class X includes at least one of minimum peak EIRP, maximum output power, or spherical coverage.

In accordance with an embodiment of the present disclosure, a disclosure of the present specification provides a wireless device operating in a wireless communication system, the wireless device comprising: at least processor; and at least one computer memory operably connectable to the at least one processor, wherein the at least one processor is configured to perform operations comprising: generating uplink signal, wherein power class of the wireless device is power class X, based on that the wireless device is a vehicular wireless device configured to use an operating band including frequency range around 60 GHz, wherein at least one transceiver of the wireless device is configured to satisfy a RF requirement for the power class X, and wherein the RF requirement for the power class X includes at least one of minimum peak EIRP, maximum output power, or spherical coverage.

In accordance with an embodiment of the present disclosure, a disclosure of the present specification provides at least one CRM storing instructions that, based on being executed by at least one processor, perform operations comprising: generating uplink signal, wherein power class of a device including the at least one processor is power class X, based on that the device is a vehicular device configured to use an operating band including frequency range around 60 GHz, wherein at least one transceiver of the device is configured to satisfy a RF requirement for the power class X, and wherein the RF requirement for the power class X includes at least one of minimum peak EIRP, maximum output power, or spherical coverage.

According to a disclosure of the present disclosure, the above problem of the related art is solved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 7 is examples of the Required EIRP with assumption of Antenna Gain={15 dBi, 18 dBi or 21 dBi} and IL=7 dB.

FIG. 9 illustrates examples of Tx Antenna Gain and Tx Power for Required EIRP.

FIG. 10 shows examples of the related requirement based on average antenna element gain of 4.5 dBi.

FIG. 11 shows examples of the related requirement based on 8 antennas in array.

FIG. 13 shows examples of Minimum Peak EIRP at frequency band including 63 GHz.

FIG. 14 shows examples of Minimum Peak EIRP at frequency band around 60 GHz.

FIG. 15 shows an example of phase error when rotation is not applied.

DETAILED DESCRIPTION

Figure 1:
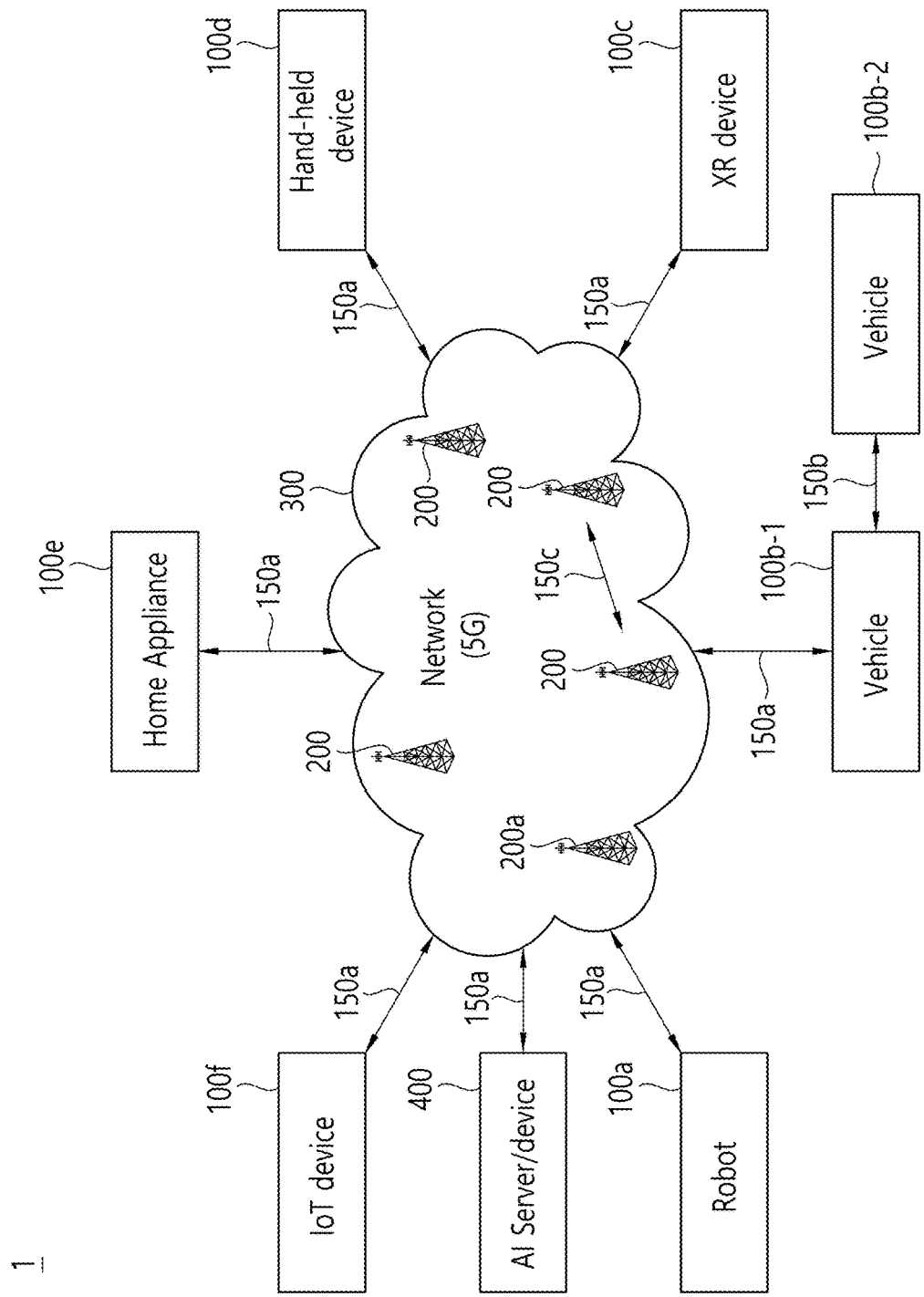
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Although user equipment (UE) is illustrated in the accompanying drawings by way of example, the illustrated UE may be referred to as a terminal, mobile equipment (ME), and the like. In addition, the UE may be a portable device such as a notebook computer, a mobile phone, a PDA, a smart phone, a multimedia device, or the like, or may be a non-portable device such as a PC or a vehicle-mounted device.

Hereinafter, the UE is used as an example of a wireless communication device (or a wireless device, or a wireless apparatus) capable of wireless communication. An operation performed by the UE may be performed by a wireless communication device. A wireless communication device may also be referred to as a wireless device, a wireless device, or the like.

A base station, a term used below, generally refers to a fixed station that communicates with a wireless device. The base station may be referred to as another term such as an evolved-NodeB (eNodeB), an evolved-NodeB (eNB), a BTS (Base Transceiver System), an access point (Access Point), gNB (Next generation NodeB), etc.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc.

The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
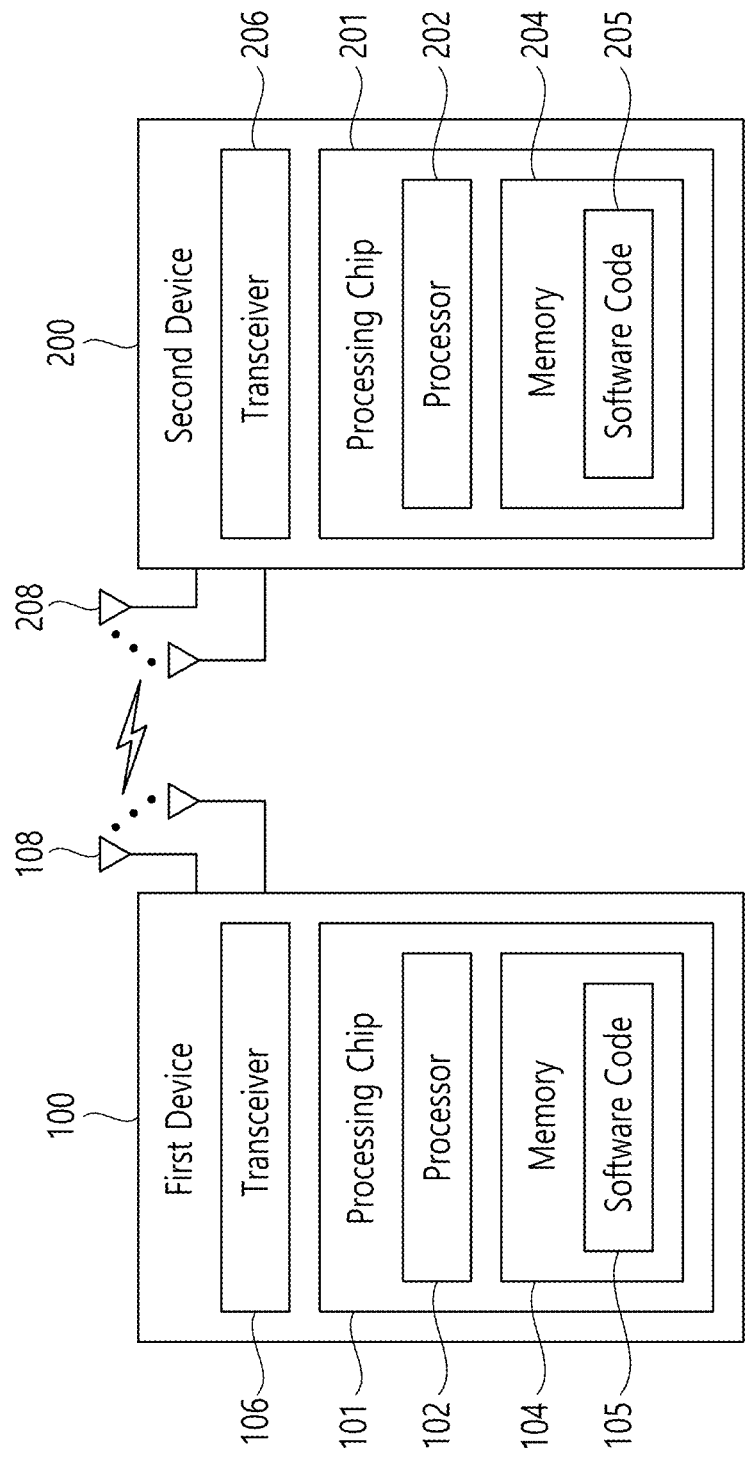
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
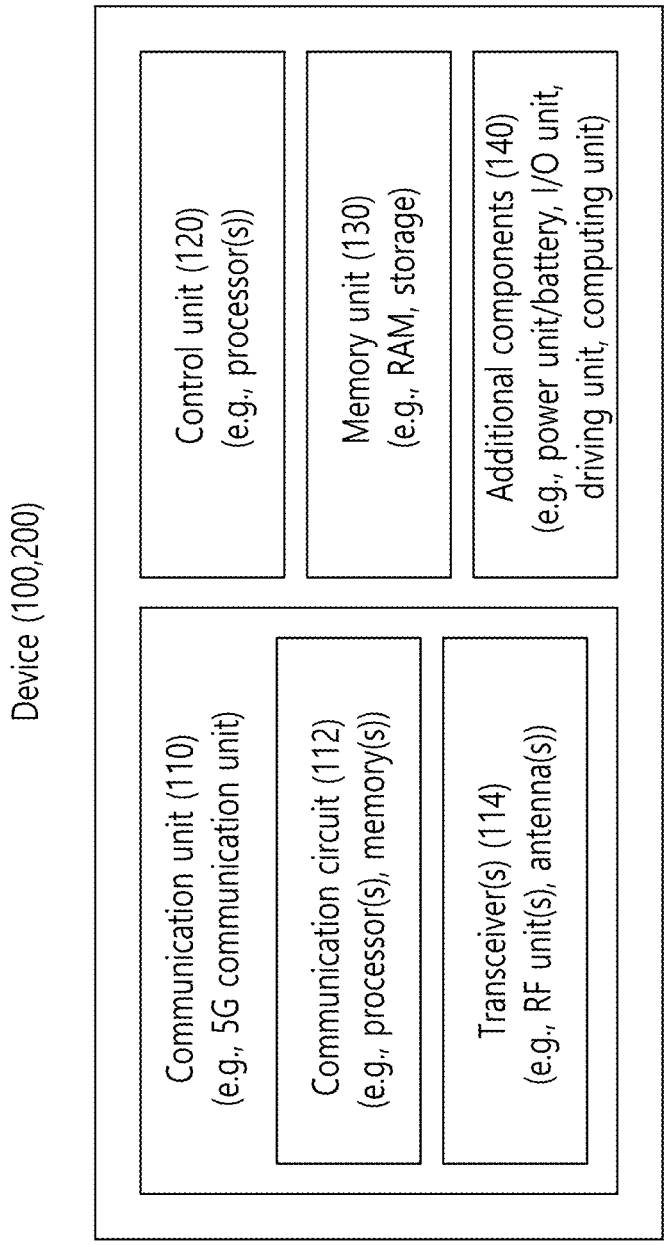
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Disclosure of the Present Specification

Standard requirements for a NR vehicular UE operating based on the frequency band around 60 GHz (e.g. 52.6 GHz~71 GHz, frequency band including 63 GHz) is not currently determined. Hereinafter, the frequency band around 60 GHz may mean frequency band included in a frequency range of 52.6 GHz~71 GHz. "frequency band around 60 GHz" and "frequency band including 63 GHz" are used as examples for representing the frequency band included in the frequency range of 52.6 GHz~71 GHz.

The disclosure of the present specification provides overall transmit RF requirements for the NR vehicular UE operating based on the frequency band around 60 GHz (e.g. frequency band including 63 GHz). For example, the overall transmit RF requirements may include vehicular UE RF transmit power requirement, beam correspondence, etc.

For providing the RF requirements for the frequency band around 60 GHz (e.g. frequency band including 63 GHz), it is necessary to first look at the link budget considering the Intelligent Transport System (ITS) application in the frequency band around 60 GHz (e.g. frequency band including 63 GHz), global regulation, and channel characteristics.

Hereinafter, frequency band including 63 GHz is used as an example of the frequency band around 60 GHz. That is, following descriptions related to frequency band including 63 GHz written in the present specification may be applied to the frequency band around 60 GHz in the same way.

1. Overview of ITS at Frequency Band Around 60 GHz (e.g. 63 GHz)

According to EU Electronic Communications Committee (ECC) REPORT 113, the functionality required of a millimetric, high data rate communication system for next-generation transport telematics is that the functionality should support Vehicle to Vehicle (V2V) communication and Rode Side Units (RSU) to Vehicle (R2V) communication in a dynamic traffic environment.

For example, supporting V2V communication and R2V communication in the dynamic traffic environment may include supporting communication in a a traffic environment in a range of weather conditions, supporting communication with communication ranges extending to several hundred meters, supporting capability of providing broadcast, point-to-point and vehicle cluster connectivity, and supporting communication with a user density, up to 330 vehicles per a square km in the urban environment (see ECC Report 23).

Table 3 shows examples of general application groups for ITS at the frequency band including 63 GHz.

TABLE 3

| Application | Description |
|---|---|
| 1 Automatic Fee Collection (AFC) Access | Charges for use of roads at point of use/allows access to controlled area. |

TABLE 3-continued

| Application | Description |
| --- | --- |
| 2 Traffic Information | Sends data to car advising of traffic congestion, poor visibility ahead. |
| 3 Route Guidance | Advises driver on traffic flow problems ahead and alternative routes. |
| 4 Traffic monitoring | Gathers information for traffic management. |
| 5 Parking Management | Enables driver to check ahead on availability of parking and to pre-book. |
| 6 Freight and Fleet Management | Efficient management of freight and fleet. For example, locates vehicles and transmits nature of cargo to save time at border controls. |
| 7 In car internet/PC mobile office | Provides an internet style access of telematic data |
| 8 Co-operative Driving | Alerts driver to other vehicles' braking, changing lane etc. |
| 9 Platoons/Road trains | Organizes a number of vehicles into convoys. |
| 10 Emergency warning | Alerts driver to sudden manoeuvers or failures of nearby vehicles. |
| 11 Intelligent Intersection Control | Alerts driver to other vehicles at intersections. |
| 12 Feed from radio station | Local, national or international radio stations stream live (only with Node backhaul) or pre-recorded (content on Node) via Nodes. |
| 13 Stolen Vehicle Alarm, tracking and recovery | Unauthorized movement of vehicle (or boat) is detected and authorities alerted. Vehicle is then tracked for recovery. |

Technical descriptions for ITS are described hereinafter referring to an example of FIG. 4 and an example of Table 4.

The following drawings are prepared to explain a specific example of the present specification. Since the names of specific devices or names of specific signals/messages/fields described in the drawings are provided by way of example, technical features of the present specification are not limited to specific names used in the following drawings.

Figure 4:
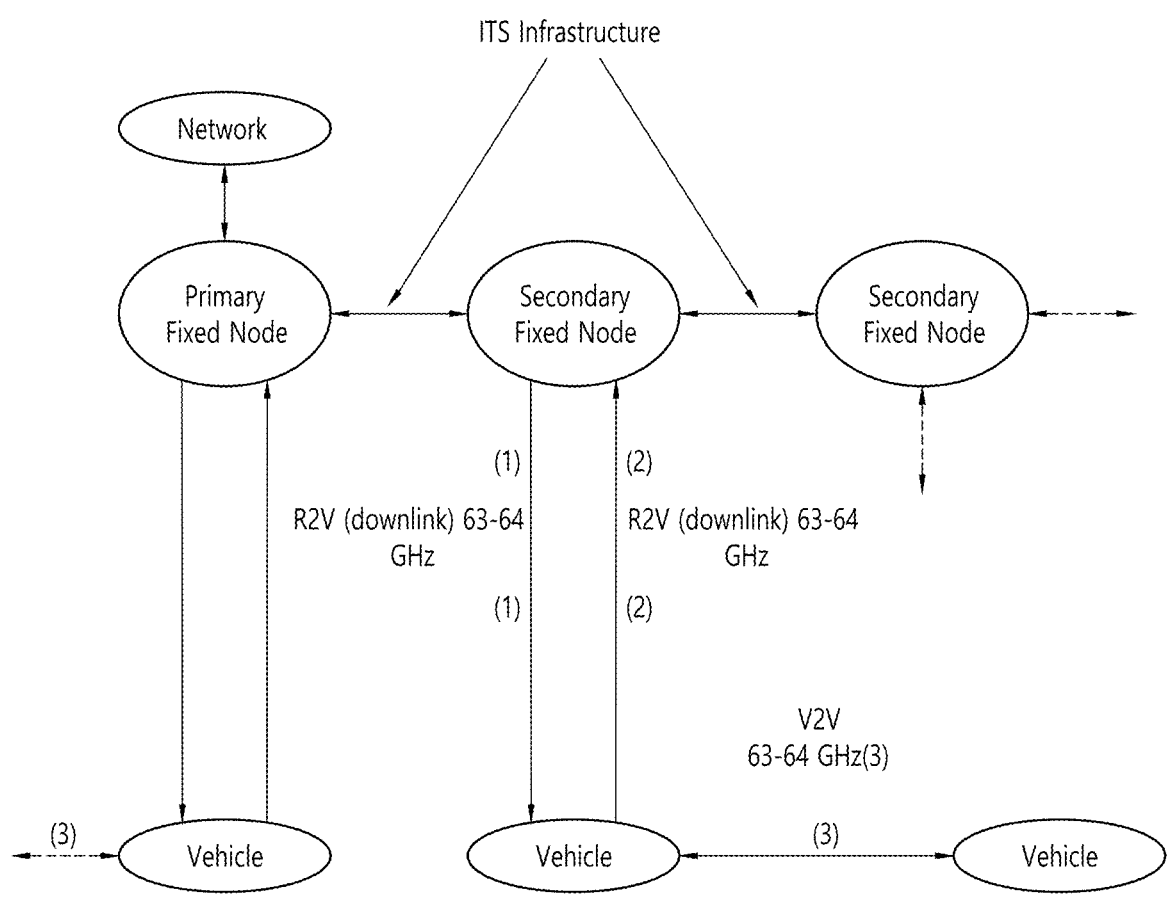
FIG. 4 illustrates an example of possible architecture of ITS network.

FIG. 4 illustrates an example of possible architecture of ITS network.

Refer to FIG. 4, a frequency band with a frequency range of 63 GHz to 64 GHz is drawn as an example of the frequency band including 63 GHz. Fixed nodes in FIG. 4 may be RSU and/or a base station (e.g. gNB, eNB, etc.)

According to FIG. 4, ITS infrastructure may exist between fixed nodes in ITS network. In ITS network, various kinds of communication may be performed. For example, (1) R2V communication (uplink) based on the frequency band including 63 GHz may be performed by the fixed node and a vehicle (vehicular UE), (2) R2V communication (downlink) based on the frequency band including 63 GHz may be performed by the fixed node and a vehicle (vehicular UE), and (3) V2V communication based on the frequency band including 63 GHz may be performed by vehicles (vehicular UEs).

For reference, European Telecommunications Standards Institute (ETSI) Technical Report (TR) 102 400 provides technical details for ITS in the frequency range including 63 GHz. Table 4 shows an example of ITS characteristics.

TABLE 4

| Parameter | Values/Characteristics |
| --- | --- |
| Frequency | 63 GHz |
| EIRP | 40 dBm |
| Antenna gain of RSU | 23 dBi(1) |
| Antenna gain of Vehicle(V2V, V2R) | 21 dBi(3) for V2V, 14 dBi(2) for V2R |
| Range | typically up to 300 m |
| Noise Figure(NF) | 10 dB |

TABLE 4-continued

| Parameter | Values/Characteristics |
| --- | --- |
| Noise floor @ 50 MHz | −87 dBm (Note) |
| SNR(Link budget) | 6 dB |

(Note):
Noise floor = −174 dBm(kT) + 10log10(RxBW) + NF

In Table 4, "(1)" may mean the R2V communication (uplink) based on the frequency band including 63 GHz may be performed by the fixed node and a vehicle (vehicular UE) shown in FIG. 4, "(2)" may mean R2V communication (downlink) based on the frequency band including 63 GHz may be performed by the fixed node and a vehicle (vehicular UE) shown in FIG. 4, and "(3)" may mean V2V communication based on the frequency band including 63 GHz may be performed by vehicles (vehicular UEs) shown in FIG. 4.

In Table 4, RxBw may mean receiving bandwidth (BW). EIRP may mean Equivalent (or Effective) Isotropic Radiated Power. SNR may mean Signal to Noise Ratio.

2. Regulation on Frequency Band Around 60 GHz (e.g. 63 GHz)

There are regulation for communication based on the frequency band around 60 GHz (e.g. 63 GHz). The followings are exemplary regulations.

1) Federal Communications Commission (FCC) Rules

The FCC revised its rules for the license-free/unlicensed millimeter wave 60 GHz band in 2016. This band is referred to as the 57-71 GHz band in section 15.255 of the FCC's rules (FCC, 2016). FCC Rules are defined as the following examples:

Average emitted Equivalent (or Effective) Isotropic Radiated Power (EIRP) must not exceed 40 dBm (10 W); and Peak power of any emission must not exceed 43 dBm (20 W) EIRP, as measured during a transmission interval.

2) European Telecommunications Standards Institute (ETSI) Standard

The ETSI EN 305 550 standard for the unlicensed 60 GHz band, ETSI EN 305 550 V2.1.0 [ETSI 2014a, 2014b] is defined.

The EN 305 550 standard includes three restrictions with which a short range miniature radar system must comply. Two restrictions relate to a mean radiated power, and one relates to a mean power spectral density as the following example:

The mean radiated EIRP must not exceed 100 mW (20 dBm).

The mean transmission output power must not exceed 10 mW (10 dBm).

The mean transmission output power spectral density must not exceed 13 dBm/MHz EIRP.

3. Link Budget Frequency Band Around 60 GHz (e.g. 63 GHz)

Communication along boresight of a directional antenna is considered. To address link budget, path loss and Oxygen absorption may be considered as the following example:

Path Loss (PL)=20 log $10(d_{km})$+20 log $10(fc_{MHz})$+32.44 (dB)

Oxygen absorption=10 dB/Km.

Figure 5:
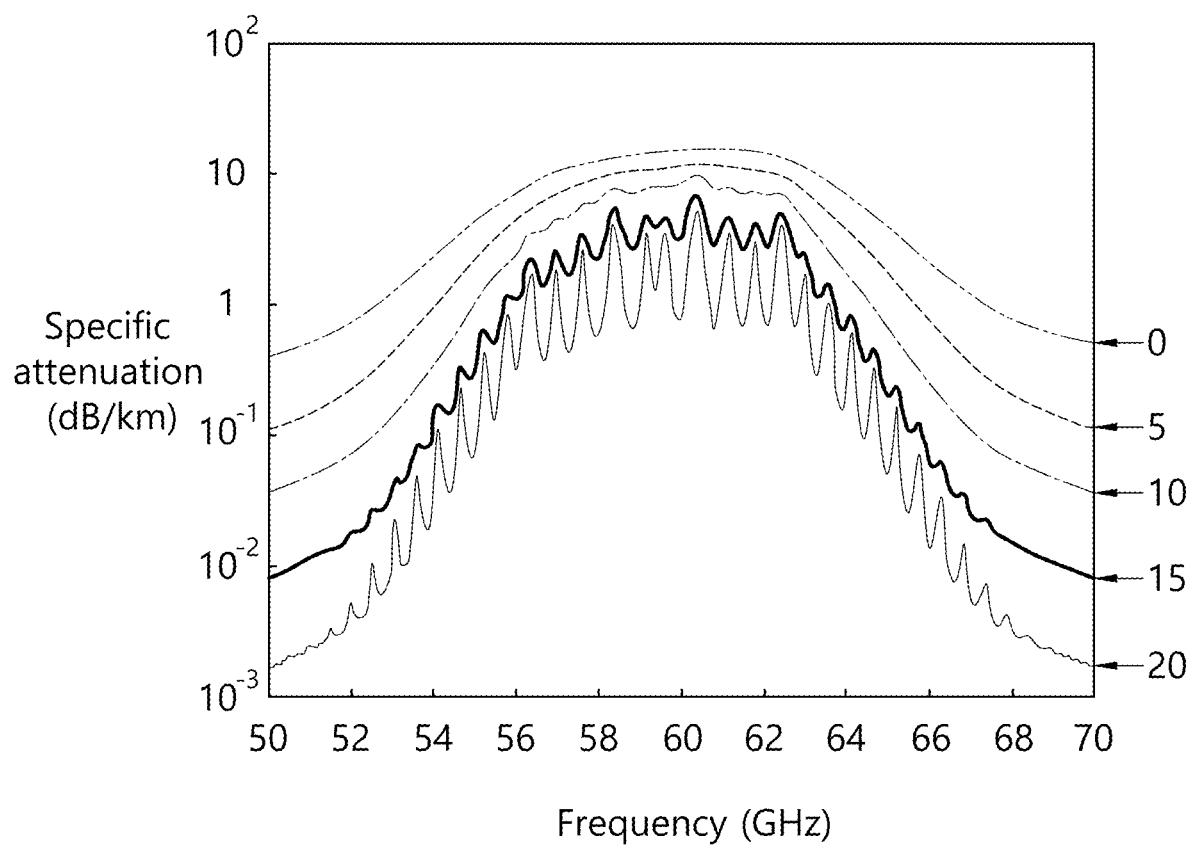
FIG. 5 illustrates an example of Oxygen Attenuation for different altitudes.

FIG. 5 shows an example of Oxygen Attenuation based on an unit of dB/km.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 5 illustrates an example of Oxygen Attenuation for different altitudes.

In FIG. 5, 0, 5, 10, 15, 20 at the right side mean different altitudes. For example, 0 means 0 km, 5 means 5 km, 15 means 15 km, 20 means 20 km. Signal transmitted based on a frequency range of 50 GHz to 70 GHz is reduced in signal size by oxygen (e.g. oxygen included in water molecules) in the atmosphere. The magnitude of the reduction is defined in dB per km and varies with altitude. Referring to FIG. 5, based on that "Oxygen absorption=10 dB/Km", when altitude is 0 km and distance for signal transmission/reception is 300 m, Oxygen attenuation of 3 dB is derived. That is, Oxygen attenuation=3 dB @300 m.

Required EIRP for frequency band around 60 GHz (e.g. 63 GHz) may be determined based on "Required EIRP=Wanted Rx Signal Level @ Air+PL+Oxygen Attenuation". To determine Required EIRP, the following parameters and assumptions may be considered.

When the followings may be assumed:
Rx Bandwidth=50 MHz;
Rx SNR=6 dB;
Noise Floor=−87 dBm @50 MHz; and
Distance between two vehicles=300 m.
Wanted Rx Signal Level @ RF may be:
Target Rx Signal @ RF=−81 dBm.
Wanted Rx Signal Level @ Air may be:
Target Rx Signal @ Air=Target Rx Signal @RF−Rx Antenna Gain (Grx)+ImplementationLoss (IL)=−81 dBm−Grx+IL.

Path loss and Oxygen attenuation at distance of 300 m may be:
PL=118 dB @300 m
Oxygen attenuation=3 dB @300 m.

In a result, the required EIRP may be:
Required EIRP=Wanted Rx Signal Level @ Air+PL+Oxygen Attenuation={−81−Grx+IL}+118+3=40 dBm−Grx+IL.

Figure 6:
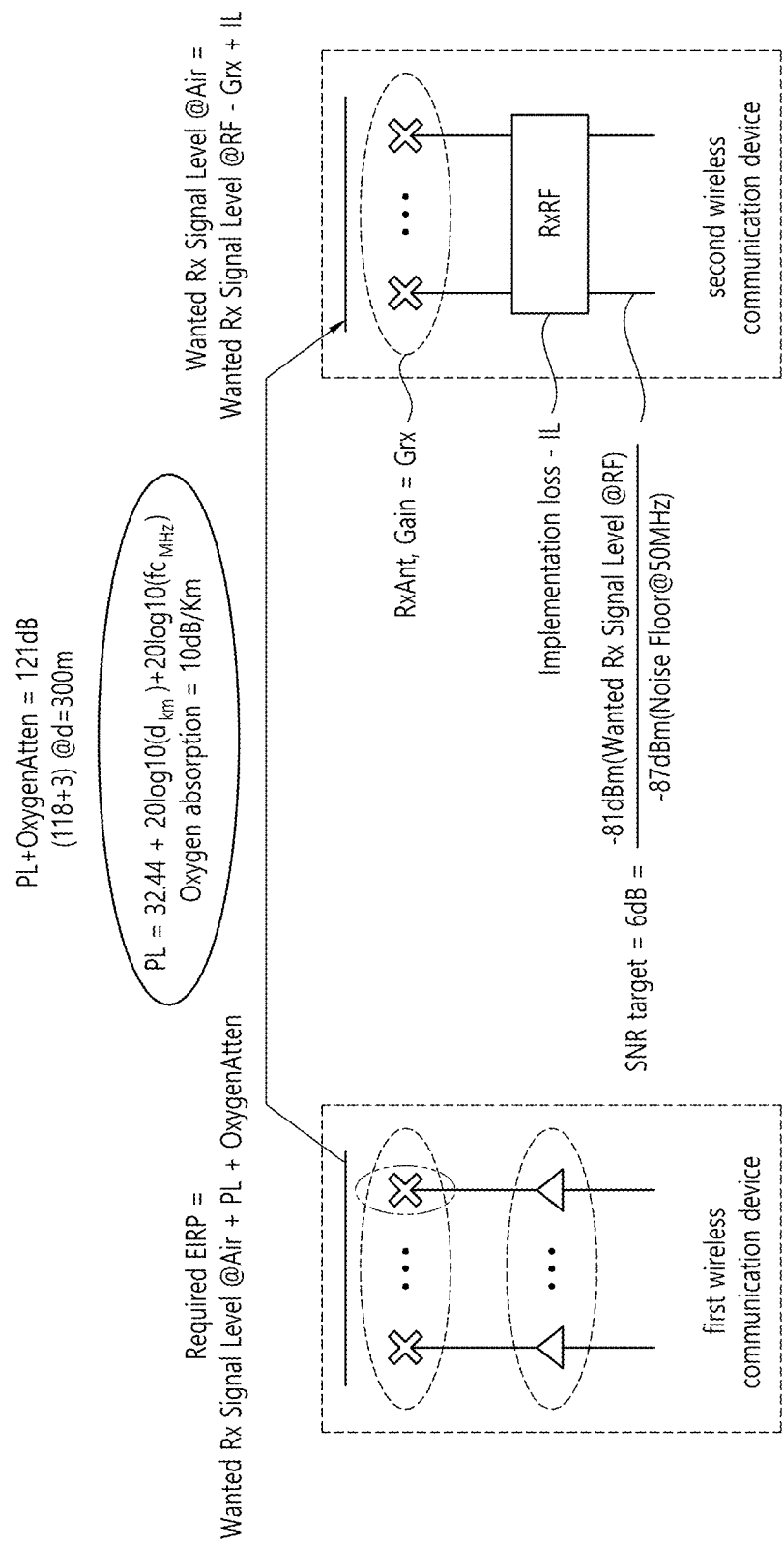
FIG. 6 shows an example of Link budget for frequency band around 60 GHz (e.g. 63 GHz).

FIG. 6 shows a detailed example of Link budget.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 6 shows an example of Link budget for frequency band around 60 GHz (e.g. 63 GHz).

In FIG. 6, a first wireless communication device transmits signal to a second wireless communication device. Both the first wireless communication device and the second wireless communication device perform communication based on the frequency band around 60 GHz (e.g. 63 GHz).

As explained in the above assumptions, Rx Bandwidth may be 50 MHz, Rx SNR (SNR target in FIG. 6) may be 6 dB, Noise Floor may be −87 dBm @50 MHz, Distance between two vehicles may be 300 m.

Based on that Rx SNR (SNR target in FIG. 6) is 6 dB and Noise Floor is −87 dBm @50 MHz, Wanted Target Rx Signal @ RF may be −81 dBm as shown in FIG. 6. Wanted Rx Signal Level @ Air (Target Rx Signal @ Air) may be Target Rx Signal @RF−Rx Antenna Gain (Grx)+Implementation Loss (IL)=−81 dBm−Grx+IL.

As explained in above mentioned examples, PL may be 118 dB at 300 m, Oxygen attenuation may be 3 dB at 300 m.

Required EIRP may be Wanted Rx Signal Level @ Air+PL+Oxygen Attenuation. That is, required EIRP=Wanted Rx Signal Level @ Air+PL+Oxygen Attenuation={−81−Grx+IL}+118+3=40 dBm−Grx+IL.

Thus, Required EIRP may be 40 dBm−Grx+IL.

The following FIG. 7 shows examples of the Required EIRP with assumption of Antenna Gain={15 dBi, 18 dBi or 21 dBi} and IL=7 dB for different distance between vehicles.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 7 is examples of the Required EIRP with assumption of Antenna Gain={15 dBi, 18 dBi or 21 dBi} and IL=7 dB.

As shown in FIG. 7, Rx Antenna gain is assumed to be 15 dBi, 18 dBi or 21 dBi. IL is assumed to be 7 dB.

As explained above referring to FIG. 6, Wanted Rx Signal Level @ Air (Target Rx Signal @ Air) may be Target Rx Signal @RF−Rx Antenna Gain (Grx)+Implementation Loss (IL)=−81 dBm−Grx+IL. Herein, Grx may be 15 dBi, 18 dBi or 21 dBi and IL may be 7 dB. Thus, Wanted Rx Signal Level @ Air may be −89 dBm for 15 dBi of Grx, Wanted Rx Signal Level @ Air may be −92 dBm for 18 dBi of Grx, Wanted Rx Signal Level @ Air may be −95 dBm for 21 dBi of Grx.

As explained above referring to FIG. 6, Required EIRP may be Wanted Rx Signal Level @ Air+PL+Oxygen Attenuation. In FIG. 7, Required EIRP based on combinations of distances, such as 100 m, 200 m, 300 m, 500 m, 700 m, 1000 m, and Rx antenna gain, such as 15 dBi, 18 dBi, 21 dBi. For example, in case that distance between vehicles is 100 m, the Required EIRP may be 20 dBm for Rx antenna gain of 15 dBi, the Required EIRP may be 17 dBm for Rx antenna gain of 18 dBi, the Required EIRP may be 14 dBm for Rx antenna gain of 21 dBi.

The following drawings are prepared to explain a specific example of the present specification. Since the names of specific devices or names of specific signals/messages/fields described in the drawings are provided by way of example, technical features of the present specification are not limited to specific names used in the following drawings.

Figure 8:
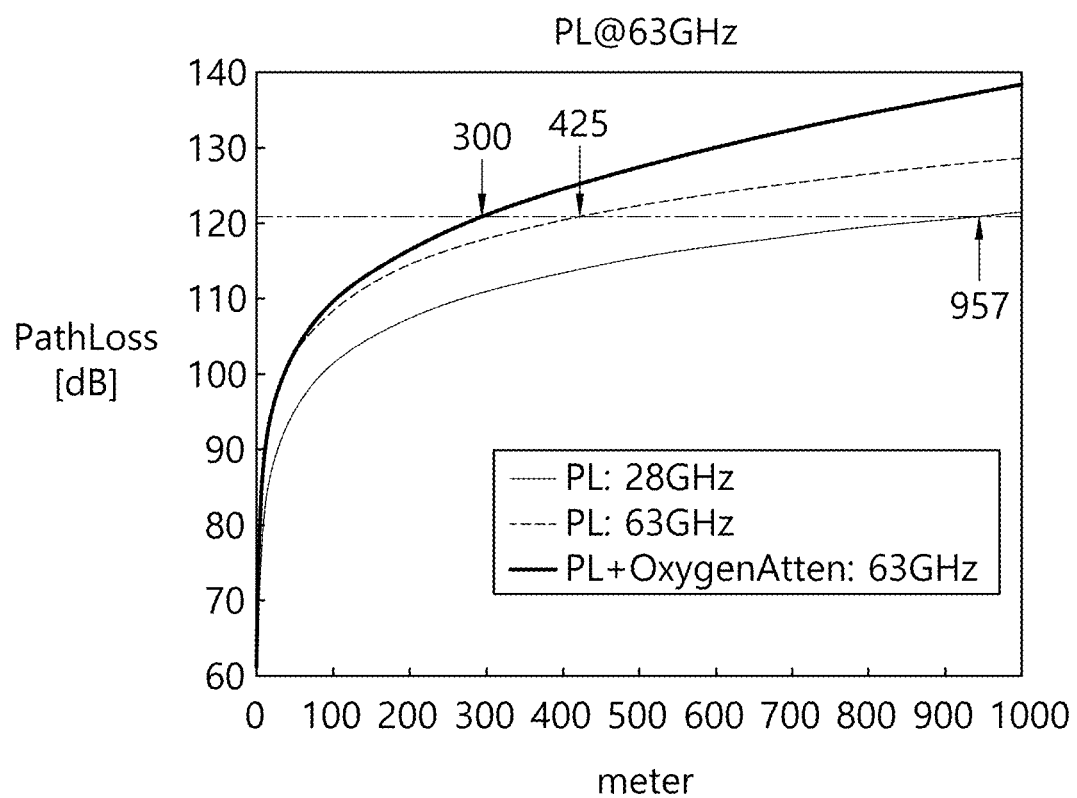
FIG. 8 shows examples of Pathloss according to distances.

FIG. 8 shows examples of Pathloss according to distances.

FIG. 8 shows examples of different distance for the same pathloss value between vehicles for 28 GHz and 63 GHz. Reference point is 300 m at frequency band including 63 GHz with Oxygen attenuation. If assuming same Antenna Gain and same Tx power, communication distance at 63 GHz is reduced by about 650 m compared to 28 GHz. It is because pathloss value at 957 m for a vehicle using frequency band including 28 GHz is equal to pathloss value at 300 m for a vehicle using frequency band including 63 GHz with consideration of Oxygen attenuation.

The required EIRP shown in the examples of FIG. 7 can be gotten with summation of Tx Antenna Gain and Tx Power as seen in examples of FIG. 9.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 9 illustrates examples of Tx Antenna Gain and Tx Power for Required EIRP.

Required EIRP may be determined based on "Required EIRP=Tx Antenna Gain (Gtx)+Tx Power−Implementation Loss".

Herein, Tx Antenna Gain may be determined based on "Tx Antenna Gain=Realized antenna array gain+polarization gain".

Herein, Realized antenna array gain may be determined based on "Realized antenna array gain=Average antenna element gain+antenna roll-off loss vs frequency+10 $\log_{10}$(# of antenna in array). "#" may mean number. That is, # of antenna in array may mean a number of antenna in the array.

Polarization gain may be assumed to be 2.5 dB in FIG. 9.

Tx Power may be determined based on "Tx Power=Pout per element+10 $\log_{10}$(# of antenna in array)". Pout may mean output power.

Implementation Loss (IL) may be determined based on "Implementation Loss (IL)=Mismatch and transmission line loss including load pull+Beam forming loss(phase shifter and amplitude error)+Finite beam table+Beam forming loss (one beam table fits all)+Form-factor integration losses". IL is assumed to be 8 dB in FIG. 9.

To guarantee up to 300 m (as shown in the example of Table 4) as communication range of ITS based on the analysis in "1. Overview of ITS at frequency band around 60 GHz (e.g. 63 GHz)", the required EIRP may be determined to be the following examples:

32 dBm (Required EIRP=Tx Antenna Gain of 15 dBi+Tx Power of 25 dBm−IL(8))
29 dBm (Required EIRP=Tx Antenna Gain of 18 dBi+Tx Power of 19 dBm−IL(8))
26 dBm (Required EIRP=Tx Antenna Gain of 21 dBi+Tx Power of 13 dBm−IL(8))

In the above examples Tx Antenna gain is assumed to be equal to Rx antenna gain (e.g. 15 dBi, 18 dBi, 21 dBi).

FIG. 10 shows examples of the related requirement in order to guarantee the expected (or required) EIRP for distances (200 m, 300 m, 400 m, 800 m) when using average antenna element gain of 4.5 dBi. 32 dBm, 29 dBm, 26 dBm are examples of Required EIRP for 300 m derived from FIG. 7.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 10 shows examples of the related requirement based on average antenna element gain of 4.5 dBi.

In examples of FIG. 10, Required EIRP may be determined based on "Required EIRP=Tx Antenna Gain(Gtx)+Tx Power−Implementation Loss". Tx Antenna Gain may be determined based on "Tx Antenna Gain=Realized antenna array gain+polarization gain". Realized antenna array gain may be determined based on "Realized antenna array gain=Average antenna element gain+antenna roll-off loss vs frequency+10 $\log_{10}$(# of antenna in array). Tx Power may be determined based on "Tx Power=Pout per element+10 $\log_{10}$(# of antenna in array)". For reference, related requirements for distance of 200 m, 400 m, 800 m are additional examples of analysis other than related requirements for distance of 300 m.

FIG. 11 shows examples of the related requirement in order to guarantee the expected (or required) EIRP for distances (200 m, 300 m, 320 m, 500 m) when using 8 antennas in array. 32 dBm, 29 dBm, 26 dBm are examples of Required EIRP for 300 m derived from FIG. 7.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 11 shows examples of the related requirement based on 8 antennas in array.

In examples of FIG. 11, Required EIRP may be determined based on "Required EIRP=Tx Antenna Gain(Gtx)+Tx Power−Implementation Loss". Tx Antenna Gain may be determined based on "Tx Antenna Gain=Realized antenna array gain+polarization gain". Realized antenna array gain may be determined based on "Realized antenna array gain=Average antenna element gain+antenna roll-off loss vs frequency+10 $\log_{10}$(# of antenna in array). Tx Power may be determined based on "Tx Power=Pout per element+10 $\log_{10}$(# of antenna in array)". For reference, related requirements for distance of 200 m, 320 m, 500 m are additional examples of analysis other than related requirements for distance of 300 m.

Based on the analysis explained above with various examples, the disclosure of the present specification specifies UE Transmit RF requirements.

4. Transmitter Characteristics

The transmitter characteristics are defined with minimum Peak EIRP, 32 dBm 34 dBm as baseline regarding additional power due to Oxygen attenuation at frequency band around 60 GHz (e.g. frequency band including 63 GHz), comparing to 29 dBm which was already specified for Power Class 2 (vehicular UE) in FR2 (Frequency Range 2).

minimum peak EIRP=32 dBm~34 dBm

Based on analysis explained with FIG. 10 and FIG. 11, communication range is up to from 300 m to 400 m with the EIRP. For example, EIRP of 32 dBm may correspond to 300 m of distance in examples of FIG. 10 and FIG. 11. EIRP of 34 dBm may correspond to 400 m of distance in examples of FIG. 10 and FIG. 11. Also, considering implementation for antenna operating based the frequency band around 60 GHz (e.g. 52.6 GHz~71 GHz, frequency band including 63 GHz), antenna gain of 4.5 dBi may be used.

Unless otherwise stated, the transmitter characteristics are specified over the air (OTA) with a single or multiple transmit chains.

Transmitter power may be explained. For example, UE maximum output power is explained below.

Power class (PC) 1, 2, 3, and 4 are specified as Table 5 based on the assumption of certain UE types with specific device architectures in FR2. The UE types can be found in the Table 5.

TABLE 5

| UE Power class | UE type |
| --- | --- |
| 1 | Fixed wireless access (FWA) UE |
| 2 | Vehicular UE |
| 3 | Handheld UE |
| 4 | High power non-handheld UE |

Table 5 shows examples of UE power classes and assumption of UE Types.

Power class 3 of Table 5 may be a default power class.

However, in the examples shown in Table 5, vehicular UE based on frequency band around 60 GHz (e.g. frequency band including 63 GHz) is not considered for UE Power class. For example, vehicular UE in Table 5 means vehicular UE based on FR2, which has corresponding frequency range of 24250 MHz-52600 MHz.

Herein, how to differentiate vehicular UE at FR2 and vehicular UE at frequency band around 60 GHz (e.g. frequency band including 63 GHz) is needed to be solved. For differentiating FR2 and frequency band around 60 GHz (e.g. frequency band including 63 GHz), new frequency range, such as frequency range 4 (FR4), is assumed for frequency band around 60 GHz (e.g. frequency band including 63 GHz). For reference, "FR4" is just an example for the new frequency range, the exact number coming after "FR" for the new frequency range can be changed. With FR4 (frequency band around 60 GHz (e.g. frequency band including 63 GHz)), the following options can be proposed.

Option 1: Define power class per Frequency Range.
Option 2: Define same power class for FR2 and FR4.

When assuming power class 'X' for vehicular UE in FR4 (Herein, X may be positive real number), Option 1 and Option 2 may be considered as the following examples.

With option 1, even though UE type is same for both vehicular UE based on FR2 and vehicular UE based on FR4, minimum Peak EIRP and spherical coverage cumulative distribution function (CDF) 'Y'%-tile (percentile) for each of the vehicular UE based on FR2 and vehicular UE based on FR4 can be different per Frequency Range.

- Use Power Class 2 for Vehicular UE in FR4. That is, same power class name "Power class 2" may be used for the vehicular UE based on FR4.
- Define package of {minimum Peak EIRP, spherical coverage CDF 'Y'%-tile (Herein, Y may be positive real number), maximum Total Radiated Power (TRP), maximum EIRP} for the power class. That is, RF requirements (e g minimum Peak EIRP, spherical coverage CDF 'Y'%-tile, maximum TRP, maximum EIRP) is defined for the vehicular UE based on FR4.

With option 2, if either minimum Peak EIRP or spherical coverage CDF 'Y'%-tile is different for vehicular UE based on FR2 and vehicular UE based on FR4, there can be some sub-options for Option 2 to define the power class. The following Option 2A and Option 2B are sub-options for Option 2.

Option 2A:
- Define new Power Class 'X' in FR2 & FR4 for Vehicular UE in FR4 (for example, X=7); and
- Define package of {minimum Peak EIRP, spherical coverage CDF 'Y'%-tile, maximum TRP, maximum EIRP} for the power class 'X'.

Option 2B:
- Use same power class (for example, X=2);
- Define new capability to differentiate minimum Peak EIRP for FR2 and FR4 when minimum Peak EIRP is different for vehicular UE based on FR2 and vehicular UE based on FR4; and
- Define new capability to differentiate spherical coverage CDF 'Y'%-tile for FR2 and FR4 using when spherical coverage CDF 'Y'%-tile is different for vehicular UE based on FR2 and vehicular UE based on FR4.

Furthermore, Option 2B further includes the following characteristics:
- Define package of {spherical coverage CDF 'Y'%-tile, maximum TRP, maximum EIRP} for the power class with new capability to differentiate minimum Peak EIRP for FR2 and FR4; or
- Define package of {minimum Peak EIRP, maximum TRP, maximum EIRP} for the power class with new capability to differentiate spherical coverage CDF 'Y'%-tile for FR2 and FR4; or
- Define package of {maximum TRP, maximum EIRP} for the power class with new capability to differentiate minimum Peak EIRP for FR2 and FR4 and with new capability to differentiate spherical coverage CDF 'Y'%-tile for FR2 and FR4.

With option 2, if both minimum Peak EIRP and spherical coverage CDF 'X'%-tile are same for FR2 and FR4:
- Reuse Power Class 2 in FR2 for Vehicular UE in FR4; and
- Define package of {minimum Peak EIRP, spherical coverage CDF 'Y'%-tile, maximum TRP, maximum EIRP} for the power class 'X'.

The following Table 6 to Table 8 are examples for defining power class based on the above explained Option 1, Option 2 (including Option 2A and Option 2B).

Table 6 shows examples for power class based on Option 1.

TABLE 6

| UE Power class | FR (Frequency Range) | UE type |
|---|---|---|
| 1 | FR4 | Fixed wireless access (FWA) UE |
| 2 | | Vehicular UE |
| 3 | | Handheld UE |
| 4 | | High power non-handheld UE |

Table 6 shows examples of power class for FR4 based on Option 1. FR4 includes frequency band around 60 GHz (e.g. frequency band including 63 GHz). Table 6 shows UE power class 1 for FR4, UE power class 2 for FR4, UE power class 3 for FR4, and UE power class 4 for FR4.

Table 7 shows examples for power class based on Option 2A.

TABLE 7

| UE Power class | FR (Frequency Range) | UE type |
|---|---|---|
| 1 | FR2 & FR4 | Fixed wireless access (FWA) UE |
| 2 | | Vehicular UE |
| 3 | | Handheld UE |
| 4 | | High power non-handheld UE |
| ... | | ... |
| 7 | | Vehicular UE |

Table 7 shows examples of power class for FR2 and FR4 based on Option 2A. UE power classes are defined for both FR2 and FR4 in Table 4. UE power class 2 is for Vehicular UE based on FR2. UE power class 4 is for Vehicular UE based on FR4.

Table 8 shows examples for power class based on Option 2B.

TABLE 8

| UE Power class | FR (Frequency Range) | UE type | Capability to differentiate minimum Peak EIRP | Capability to differentiate spherical coverage CDF 'Y' %-tile |
|---|---|---|---|---|
| 1 | FR2 & FR4 | Fixed wireless access (FWA) UE | | |
| 2 | | Vehicular UE | O | O |
| 3 | | Handheld UE | | |
| 4 | | High power non-handheld UE | | |

Table 8 shows examples of power class for FR2 and FR4 based on Option 2B. New capability to differentiate minimum Peak EIRP for FR2 and FR4 when minimum Peak EIRP is different for vehicular UE based on FR2 and vehicular UE based on FR4 is defined in Table 8. new capability to differentiate spherical coverage CDF 'Y'%-tile for FR2 and FR4 using when spherical coverage CDF 'Y'%-tile is different for vehicular UE based on FR2 and vehicular UE based on FR4 is defined in Table 8.

Based on examples in Table 8, if spherical coverage CDF 'Y'%-tile is different for vehicular UE based on FR2 and vehicular UE based on FR4 and minimum Peak EIRP is different for vehicular UE based on FR2 and vehicular UE based on FR4, vehicular UE based on FR 2 may transmit capability information to a base station. Herein the capability information may include both Capability information to differentiate minimum Peak EIRP and Capability information to differentiate spherical coverage CDF 'Y'%-tile.

Hereinafter, UE maximum output power requirements for power class 'X' are explained.

The UE maximum output power requirement for power class 'X' may includes the following requirement package:
  Minimum peak EIRP;
  Maximum Total Radiated Power (TRP);
  Maximum EIRP; and
  Minimum EIRP at Spherical coverage 'Y'%-tile CDF.

To figure out these requirements, analysis on antenna beam gain at frequency band around 60 GHz (e.g. frequency band including 63 GHz) is needed.

Figure 12:
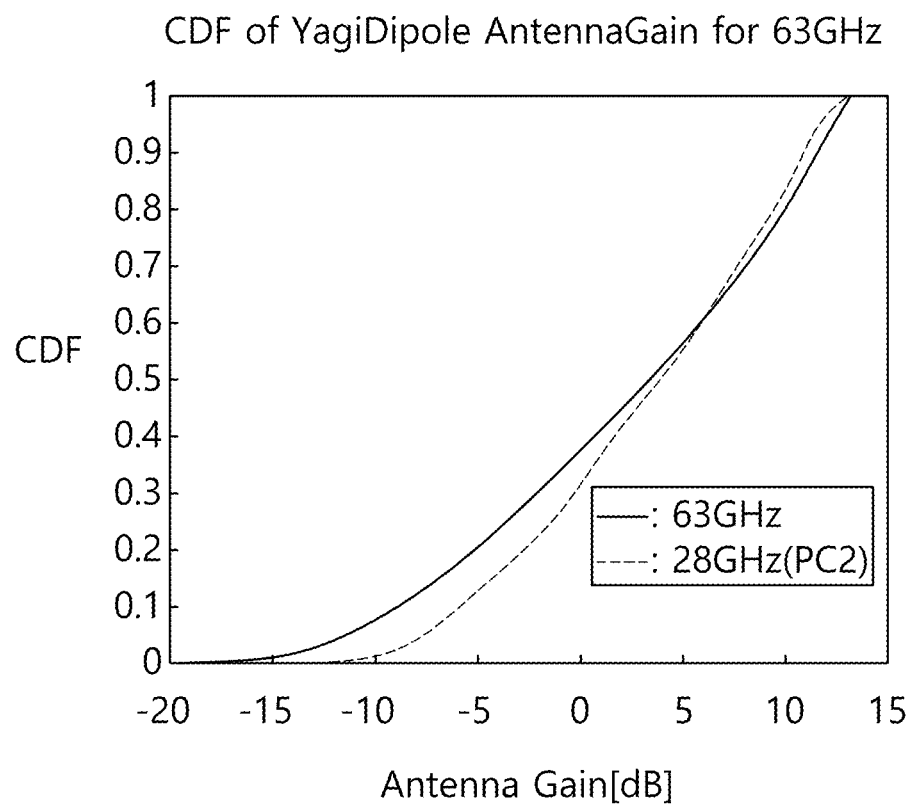
FIG. 12 shows examples of CDF of peak antenna beam gain with 63 GHz based antenna array and CDF of peak antenna beam gain with 28 GHz based antenna array.

FIG. 12 shows an example of CDF of peak antenna beam gain with 63 GHz based antenna array comparing with 28 GHz based antenna array.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 12 shows examples of CDF of peak antenna beam gain with 63 GHz based antenna array and CDF of peak antenna beam gain with 28 GHz based antenna array.

CDF of "28 GHz(PC2)" shows an example of CDF of peak antenna beam gain with 28 GHz based antenna array for PC2 UE.

According to FIG. 12, maximum antenna beam gain is about 13 dB for both 63 GHz based antenna array and 28 GHz (Power Class 2) based antenna array. And, antenna beam gain at CDF of 60%-tile is almost same for both 63 GHz based antenna array and 28 GHz based antenna array. Herein, the CDF of 60%-tile has already specified for PC2.

For minimum peak EIRP for power class 'X' at frequency band including 63 GHz, Case I is assumed as baseline in FIG. 13.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 13 shows examples of Minimum Peak EIRP at frequency band including 63 GHz.

From examples of Minimum Peak EIRP shown in FIG. 13, 32 dBm is proposed as the minimum peak EIRP at frequency band including 63 GHz. For example, 32 dB of the minimum peak EIRP is determined based on a summation of Total conducted power per polarization, Realized antenna array gain, Polarization gain, and Total implementation losses. 32 dB of the minimum peak EIRP is determined based on "Minimum Peak EIRP(32)=Total conducted power per polarization(25)+Realized antenna array gain (12.5)+Polarization gain(2.5)+Total implementation losses (−8). Herein, Total conducted power per polarization(25)= Pout per element(16)+10*log 10(# of antenna in array)=16+ 10*log 10(8)=16+9. Realized antenna array gain(12.5)= Avg. antenna element gain(4.5)+Antenna roll-off loss(−1)+ 10*log 10(# of antenna in array)=4.5−1+9=12.5, Total implementation loss(8)=Mismatch(2.5)+Beam forming loss (phase shifter and amplitude error)(0.5)+Finite beam(0.25)+ Beam forming loss (one beam table fits all)(0.25)+Form-factor integration loss(4.5)=8.

To guarantee range (e.g. to guarantee implementation margin for efficient range of Minimum Peak EIRP), Δ is proposed to be added or subtracted to 32 dBm as the following:
  Minimum peak EIRP=32 dBm±Δ, Δ=0~2 dB.

For spherical coverage, same 60%-tile CDF which is specified for PC2 at 28 GHz is proposed to be reused for power class 'X' at frequency band including 63 GHz. That is, spherical coverage for power class 'X' at frequency band including 63 GHz is based on 60%-tile CDF as the following:
  Spherical coverage=60%-tile CDF.

For minimum EIRP for power class 'X' at 60%-tile CDF for frequency band including 63 GHz, it is proposed to reuse the difference of 11 dB between minimum peak EIRP and minimum EIRP at 60%-tile CDF which is specified for power class 2 at 28 GHz. Thus, Minimum EIRP at Spherical coverage '60'%-tile CDF for power class 'X' based on frequency band including 63 GHz is defined as the following:
  Minimum EIRP at Spherical coverage '60'%-tile CDF=21 dBm±Δ, Δ=0~2 dB.

For maximum TRP for power class 'X' based on frequency band including 63 GHz, maximum TRP is proposed to be 23 dBm as the following:
  Maximum TRP=23 dBm For maximum EIRP for power class 'X' based on frequency band including 63 GHz, maximum EIRP is proposed to be 43 dBm regarding regulation at 63 GHz as the following:
  Maximum EIRP=43 dBm In summary, the following requirements are proposed to be specified for power class 'X' at frequency band including 63 GHz.

The following requirements define the maximum output power radiated by the UE for any transmission bandwidth within the channel bandwidth for non-CA configuration, unless otherwise stated. The period of measurement shall be at least one subframe (1 ms). The requirement is verified with the test metric of EIRP (Link=Beam peak search grids, Meas=Link angle). Herein, EIRP(Link=TX beam peak direction, Meas=Link angle) means measurement of the EIRP of the UE such that the measurement angle is aligned with the beam peak direction within an acceptable measurement error uncertainty.

TABLE 9

| Operating band | Min peak EIRP (dBm) |
|---|---|
| nxxx in 63 GHz~64 GHz | 32 ± Δ |

NOTE 1:
Minimum peak EIRP is defined as the lower limit without tolerance
NOTE 2:
Δ = 0~2 dB
NOTE 3:
nxxx is band number in 63 GHz~64 GHz Table 9 shows an example of UE minimum peak EIRP for power class 'X'. As written in Table 9, "nxxx" may mean an operating band including frequency range of 63 GHz~64 GHz or an operating including frequency range included in frequency range of 63 GHz~64 GHz.

The maximum output power values for TRP and EIRP are defined in Table 10 below. The maximum allowed EIRP is derived from regulatory requirements. The requirements are verified with the test metrics of TRP (Link=TX beam peak direction) in beam locked mode and EIRP (Link=TX beam peak direction, Meas=Link angle). Herein, TRP (Link=TX beam peak direction) may mean TRP OTA test. TRP OTA test may be performed based on locking beam direction of the UE to peak direction of transmission beam and measuring power based on a beam peak direction.

TABLE 10

| Operating band | Max TRP (dBm) | Max EIRP (dBm) |
|---|---|---|
| nxxx in 63 GHz~64 GHz | 23 | 43 |

Table 10 shows an example of UE maximum output power limits for power class 'X'. For example, table 10 shows an example of maximum TRP and maximum EIRP for power class 'X'. As written in Table 10, "nxxx" may mean an operating band including frequency range of 63 GHz~64 GHz or an operating including frequency range included in frequency range of 63 GHz~64 GHz.

The minimum EIRP at the 60th percentile of the distribution of radiated power measured over the full sphere around the UE is defined as the spherical coverage requirement and as the spherical coverage requirement is found in Table 11 below. The requirement is verified with the test metric of EIRP (Link=Beam peak search grids, Meas=Link angle).

TABLE 11

| Operating band | Min EIRP at 60%-tile CDF (dBm) |
|---|---|
| nxxx in 63 GHz~64 GHz | 21.0 ± Δ |

NOTE 1:
Minimum EIRP at 60%-tile CDF is defined as the lower limit without tolerance
NOTE 2:
The requirements in this table are verified only under normal temperature conditions as defined in Annex E.2.1 in TS38.101-2 V16.3.1.
NOTE 3:
Δ = 0~2 dB Table 11 shows an example of UE spherical coverage for power class 'X'. As shown in Table 11, UE spherical coverage for power class 'X' may be 21.0±Δ dBm of Min EIRP at 60%-tile CDF.

Considering a lower PA output power={4.5~7} dBm, comparing to frequency band including 63 GHz, for practical implementation in around 60 GHz, the UE maximum output power requirement for power class 'X' at frequency band around 60 GHz may be determined as the following:

For minimum peak EIRP for power class 'X' at frequency band around 60 GHz with the lower PA output power, Case Ia is assumed as baseline in FIG. 14.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 14 shows examples of Minimum Peak EIRP at frequency band around 60 GHz.

From examples of Minimum Peak EIRP shown in FIG. 14, 20.5 dBm is proposed as the minimum peak EIRP at around 60 GHz. For example, 20.5 dB of the minimum peak EIRP is determined based on a summation of Total conducted power per polarization, Realized antenna array gain, Polarization gain, and Total implementation losses. 20.5 dB of the minimum peak EIRP is determined based on "Minimum Peak EIRP(20.5)=Total conducted power per polarization(13.5)+Realized antenna array gain(12.5)+Polarization gain(2.5)+Total implementation losses(−8). Herein, Total conducted power per polarization(13.5)=Pout per element(4.5)+10*log 10(# of antenna in array)=4.5+10*log 10(8)=13.5+9. Realized antenna array gain(12.5)=Avg. antenna element gain(4.5)+Antenna roll-off loss(−1)+10*log 10(# of antenna in array)=4.5−1+9=12.5, Total implementation loss(8)=Mismatch(2.5)+Beam forming loss (phase shifter and amplitude error)(0.5)+Finite beam(0.25)+Beam forming loss (one beam table fits all)(0.25)+Form-factor integration loss(4.5)=8.

To guarantee range (e.g. to guarantee implementation margin for efficient range of Minimum Peak EIRP), Δ is proposed to be added or subtracted to 20.5 dBm as the following:

Minimum peak EIRP=20.5 dBm±Δ, Δ=0~5.5 dB

For spherical coverage, same 60%-tile CDF which is specified for PC2 at 28 GHz is proposed to be reused for power class 'X' at frequency band around 60 GHz. That is, spherical coverage for power class 'X' at frequency band around 60 GHz is based on 60%-tile CDF as the following:

Spherical coverage=60%-tile CDF.

For minimum EIRP for power class 'X' at 60%-tile CDF at frequency band around 60 GHz, it is proposed to reuse the difference of 11 dB between minimum peak EIRP and minimum EIRP at 60%-tile CDF which is specified for power class 2 at 28 GHz. Thus, Minimum EIRP at Spherical coverage '60'%-tile CDF for power class 'X' based on frequency band including 63 GHz is defined as the following:

Minimum EIRP at Spherical coverage '60'%-tile CDF=9.5 dBm±Δ, Δ=0~5.5 dB

For maximum TRP for power class 'X' based on frequency band around 60 GHz, maximum TRP is proposed to be 23 dBm as the following:

Maximum TRP=23 dBm

For maximum EIRP for power class 'X' based on frequency band including around 60 GHz, maximum EIRP is proposed to be 43 dBm regarding regulation at 63 GHz as the following:

Maximum EIRP=43 dBm

In summary, the following requirements are proposed to be specified for power class 'X' at frequency band around 60 GHz.

The following requirements define the maximum output power radiated by the UE for any transmission bandwidth within the channel bandwidth for non-CA configuration, unless otherwise stated. The period of measurement shall be at least one subframe (1 ms). The requirement is verified with the test metric of EIRP (Link=Beam peak search grids, Meas=Link angle).

TABLE 12

| Operating band | Min peak EIRP (dBm) |
|---|---|
| nxxx in around 60 GHz | 20.5 ± Δ |

NOTE 1:
Minimum peak EIRP is defined as the lower limit without tolerance
NOTE 2:
Δ = 0~5.5 dB
NOTE 3:
nxxx is band number in around 60 GHz Table 12 shows an example of UE minimum peak EIRP for power class 'X'. As written in Table 12, "nxxx" may mean an operating band including frequency range around 60 GHz.

The maximum output power values for TRP and EIRP are found in Table 13 below. The maximum allowed EIRP is derived from regulatory requirements. The requirements are verified with the test metrics of TRP (Link=TX beam peak direction) in beam locked mode and EIRP (Link=TX beam peak direction, Meas=Link angle).

TABLE 13

| Operating band | Max TRP (dBm) | Max EIRP (dBm) |
|---|---|---|
| nxxx in around 60 GHz | 23 | 43 |

Table 13 shows an example of UE maximum output power limits for power class 'X'. For example, table 13 shows an example of maximum TRP and maximum EIRP for power class 'X'. As written in Table 13, "nxxx" may mean an operating band including frequency range around 60 GHz.

The minimum EIRP at the 60th percentile of the distribution of radiated power measured over the full sphere around the UE is defined as the spherical coverage requirement and as the spherical coverage requirement is found in Table 14 below. The requirement is verified with the test metric of EIRP (Link=Beam peak search grids, Meas=Link angle).

TABLE 14

| Operating band | Min EIRP at 60%-tile CDF (dBm) |
|---|---|
| nxxx in around 60 GHz | 9.5 ± Δ |

NOTE 1:
Minimum EIRP at 60%-tile CDF is defined as the lower limit without tolerance
NOTE 2:
The requirements in this table are verified only under normal temperature conditions as defined in Annex E.2.1 in TS38.101-2 V16.3.1.
NOTE 3:
Δ = 0~5.5 dB Table 14 shows an example of UE spherical coverage for power class 'X'. As shown in Table 14, UE spherical coverage for power class 'X' may be 9.5±Δ dBm of Min EIRP at 60%-tile CDF.

5. Beam Correspondence

Beam correspondence is an ability of the UE to select a suitable beam for UL transmission based on DL measurements with or without relying on UL beam sweeping. The beam correspondence requirement is satisfied assuming the presence of both Synchronization Signal (SS)/Physical Broadcast Channel (PBCH) block (SSB) and Channel State Information Reference Signal (CSI-RS) signals and Type D QCL is maintained between SSB and CSI-RS. Type D QCL may mean QCL based on spatial Rx parameter.

Hereinafter, beam correspondence for power class 'X' according to an embodiment of the present specification is explained.

The beam correspondence requirement for power class 'X' UEs may include three components: UE minimum peak EIRP, UE spherical coverage, and beam correspondence tolerance. The beam correspondence requirement is fulfilled if the UE satisfies one of the following conditions, depending on the UE's beam correspondence capability, as defined in TS 38.306 V15.9.0:

If [bit-1], the UE shall meet the minimum peak EIRP requirement according to Table 9 or Table 12 and spherical coverage requirement according to Table 11 or Table 14 with its autonomously chosen UL beams and without uplink beam sweeping. Such a UE is considered to have met the beam correspondence tolerance requirement.

If [bit-0], the UE shall meet the minimum peak EIRP requirement according to Table 9 or Table 12 and spherical coverage requirement according to Table 11 or Table 14 with uplink beam sweeping. Such a UE shall meet the beam correspondence tolerance requirement defined in the following description and shall support uplink beam management, as defined in TS 38.306 V15.9.0.

Herein, [bit-1] and [bit-0] may mean capability of UE for beam correspondence requirements. [bit-1] may mean that the UE is capable of transmitting signal by using transmission beam autonomously corresponding to reception beam, such that the UE may satisfy beam correspondence. [bit-0] may mean that the UE is capable of transmitting signal by using transmission beam corresponding to reception beam, based on performing beam sweeping for the transmission beam such that the UE may satisfy beam correspondence.

Hereinafter, beam correspondence tolerance for power class 'X' is explained.

The beam correspondence tolerance requirement $\Delta EIRP_{BC}$ for power class 'X' UEs is defined based on a percentile of the distribution of $\Delta EIRP_{BC}$, defined as $\Delta EIRP_{BC}=EIRP_2-EIRP_1$ over the link angles spanning a subset of the spherical coverage grid points, such that EIRP$_1$ is the total EIRP in dBm calculated based on the beam the UE chooses autonomously (corresponding beam) to transmit in the direction of the incoming DL signal, which is based on beam correspondence without relying on UL beam sweeping.

EIRP$_2$ is the best total EIRP (beam yielding highest EIRP in a given direction) in dBm which is based on beam correspondence with relying on UL beam sweeping.

The link angles are the ones corresponding to the top N$^{th}$ percentile of the EIRP$_2$ measurement over the whole sphere, where the value of N is according to the test point of EIRP spherical coverage requirement for power class 'X', i.e. N=60.

Hereinafter, description related to Simulation for beam correspondence tolerance is explained.

To introduce the $\Delta EIRP_{BC}$, per beam modelling is used for simulation. For example, 2 simulation methodologies described as the following:

Option 1: Per element modelling

Option 2: Per beam modeling

Although, it is true that option 1 is based on actual beam forming process, real phase/amplitude error in option 1 is hard to be measured and modelled. Also, even if option 1 is adopted, actual error distribution might be rather different with normal distribution after RF calibration to form actual target beam. Whereas, with option 2, actual beam error can be measured and modelled. As a reason, option 2 (per beam modelling) is considered as simulation methodology in the present description.

Table 15 shows simulation parameter for per beam modeling to evaluate beam corresponding tolerance requirements.

TABLE 15

| Parameter | Unit | Value |
|---|---|---|
| M | | 9 (Number of Beam) |
| Beam pattern | | Realistic UE beam pattern on frequency band around 60 GHz (e.g. frequency band including 63 GHz) |
| Measurement Grid[1] | degree | 7.5° |
| Phase Error per Beam ($\delta_{pk}$) | degree | 3~10° |
| Amplitude Error per Beam ($\delta_{ak}$) | dB | 2 dB |
| Error in RSRP estimation($D_k$) | dB | 2 dB |

Note 1:
Constant density grid point corresponding specified degree is used

Parameters written in Table 15 are used for simulation toe valuation beam correspondence tolerance requirements.

For RSRP estimation error, ±6 dB is assumed as absolute RSRP measurement accuracy for FR'K' (FR including frequency band around 60 GHz (e.g. frequency band including 63 GHz)). Herein, 'K' may be a positive real number, such as 4. Considering target geometry (relative high geometry) on spherical coverage, actual measurement accuracy can be further enhanced as ±4 dB on each beam correspondence test point. Thus, considering 95% of confidence level which is equivalent to 2σ, existing 2 dB of σ for RSRP error distribution seems reasonable for simulation.

For Phase/Amplitude error per beam, the values should be set based on UE implementation aspect and RF calibration time/cost.

Following simulation set-up is considered for the simulation:

1) Set Ideal AWT (Analog Beam Weight Table) for K beams (->depend on UE implementations)
1-1) AWT=[W$_1$ W$_2$ W$_3$ ... W$_K$];
2) For each P UEs (P is number of UE to be simulated)
2-1) Generate Tx/Rx AWT considering Phase/Amplitude error
2-1-1) Tx AWT with error=[W$_{T1}$ W$_{T2}$ W$_{T3}$ ... W$_{TK}$]
2-1-2) Rx AWT=[W$_1$ W$_2$ W$_3$ ... W$_K$]=[W$_{R1}$ W$_{R2}$ W$_{R3}$ ... W$_{RK}$]
2-1-3) Relationship between Tx/Rx AWT:A(Q, W$_{Tk}$)=A (Q+$\delta_{pk}$, W$_{Rk}$)+$\delta_{ak}$. where $\delta_{ak}$, $\delta_{pk}$ represent amplitude error per Beam for given k Beam and phase error per Beam for given k Beam
2-2) For Given Measure point (Q) within EIRP measurement grid
2-2-1) Iterate until get statistically meaningful measurement values
2-2-1-1) Decide UE Autonomous DL(Rx) Beam selection (EIRP1)
2-2-1-1-1) Beam Index(k)=index of max(RSRP$_1$+D$_1$, RSRP$_2$+D$_2$, RSRP$_3$+D$_3$, ..., RSRP$_K$+D$_K$)=index of max(A(Q, W$_{R1}$)+D$_1$, A(Q, W$_{R2}$)+D$_2$, A(Q, W$_{R3}$)+D$_3$, ..., A(Q, W$_{RK}$)+D$_K$)
2-2-1-1-2) EIRP1=A(Q, W$_{Tk}$)
2-2-1-2) Decide UE EIRP2:
2-2-1-2-1) Size of SRS AWT is restricted by SRS-resource of M.
2-2-1-2-2) SRS AWT=[W$_{SRS\_T1}$ W$_{SRS\_T2}$ W$_{SRS\_T3}$ ... W$_{SRS\_TM}$] is subset of Tx AWT. How to select the subset is up to UE implementation.
2-2-1-2-3) EIRP$_2$=max(A(Q, W$_{SRS\_T1}$), ..., A(Q, W$_{SRS\_TM}$)) (Beam sweeping and Select best)
2-2-1-2-4) Delta_EIRP=EIRP2-EIRP1
3) If all Measurement Grid Points are Run, Get CDF of delta_EIRP In the simulation set-up, 3 different axis, X axis, Y axis, Z axis can be independently considered for rotation axis on phase error per beam, $\delta_{pk}$. For example, FIG. 15 to FIG. 18 shows examples of phase error, 30° to see more easily impact depending on referred axis for rotation.

The following drawings are prepared to explain a specific example of the present specification. Since the names of specific devices or names of specific signals/messages/fields described in the drawings are provided by way of example, technical features of the present specification are not limited to specific names used in the following drawings.

Figure 16:
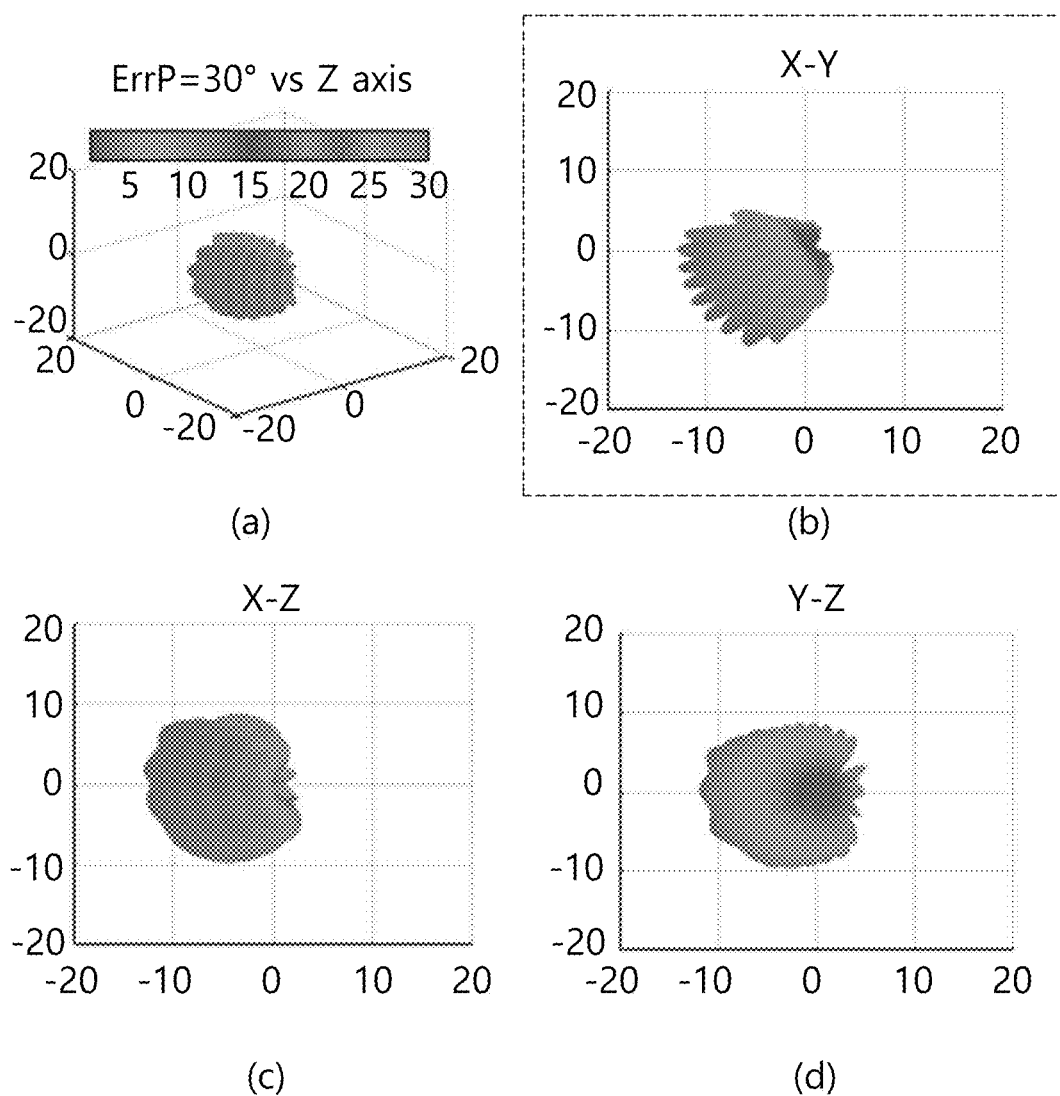
FIG. 16 shows an example of phase error when rotation is applied to Z axis.
Figure 17:
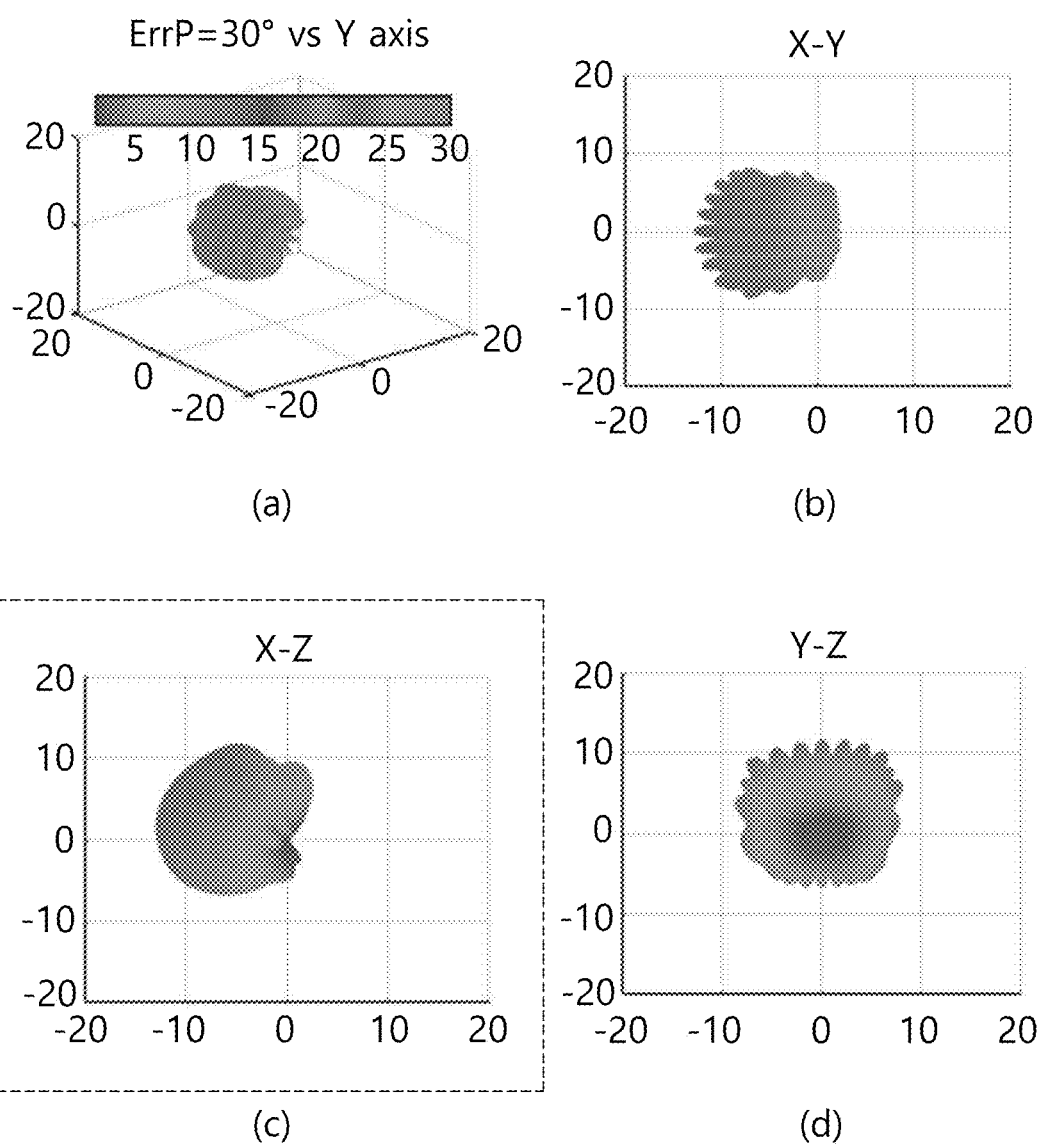
FIG. 17 shows an example of phase error when rotation is applied to Y axis.
Figure 18:
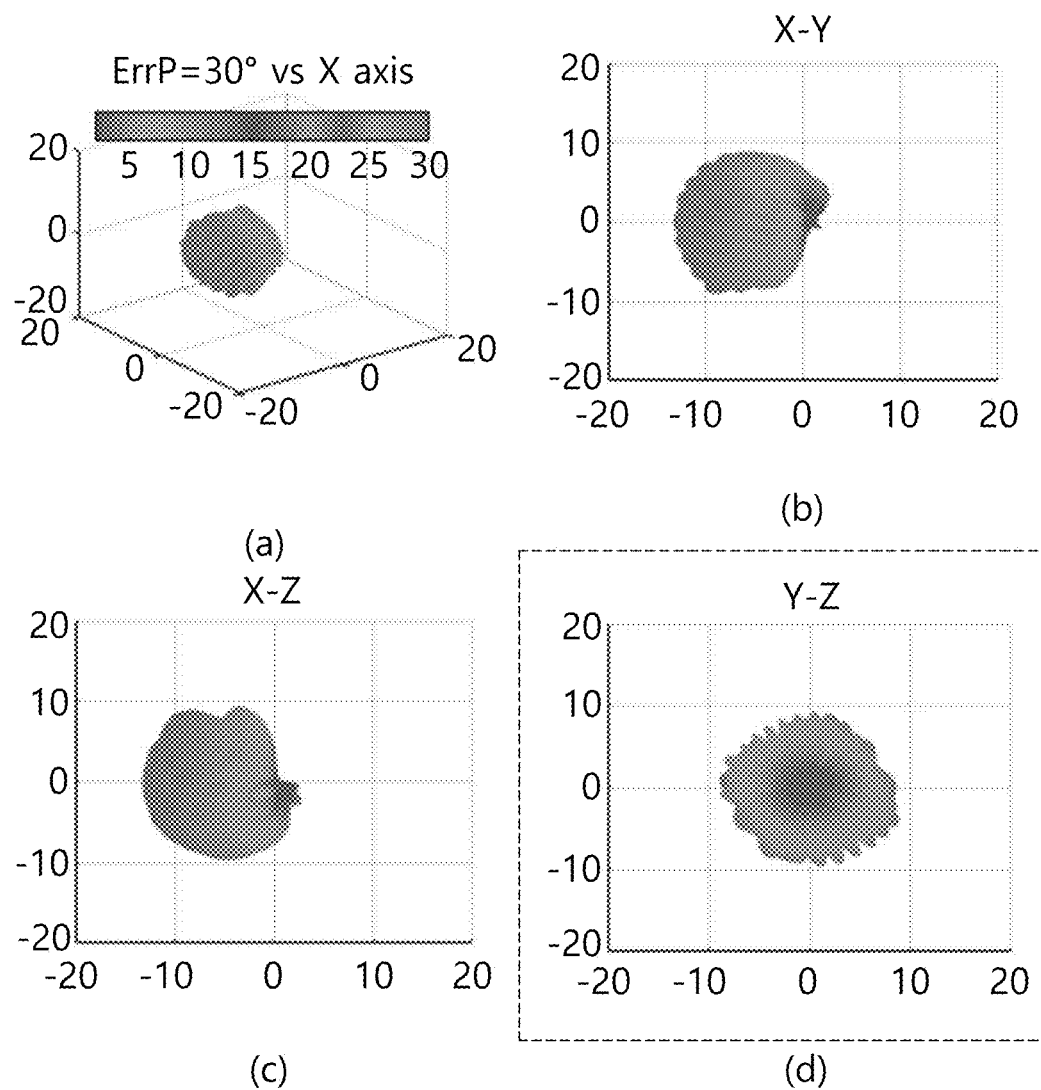
FIG. 18 shows an example of phase error when rotation is applied to X axis.

FIG. 15 shows an example of phase error when rotation is not applied. FIG. 16 shows an example of phase error when rotation is applied to Z axis. FIG. 17 shows an example of phase error when rotation is applied to Y axis. FIG. 18 shows an example of phase error when rotation is applied to X axis.

ErrP of FIG. 15 to FIG. 18 may mean a phase error comparing to an ideal beam. 0° of FIG. 15 may mean a situation that phase error does not exist. 30° of FIG. 16 may mean a situation that transmission beam has 30° of phase error with respect to Z axis.

From examples shown in FIG. 15 to FIG. 18, the impact on delta_EIRP can be different depending on the reference axis. Impact on Delta_EIRP depending the rotated axis: Z_axis>Y_axis>X_axis. For example, when the Array antenna is implemented, the 3D shape of the beam may be shown as an example of FIG. 15 (a). In FIG. 15(a), the fan-shaped beams may be layered on top of each other. Based on the EIRP in the beam peak direction, delta_EIRP becomes large when the 3D beam shape is rotated along the Z axis (e.g. examples of FIG. 16). It is because as the beam rotated with respect to Z axis, side beam, not the center (main lobe beam), is located in the original beam peak direction. The y-axis rotation (e.g. examples of FIG. 17), on the other hand, moves within the fan-shaped form, so the difference in the main lobe beam may be delta_EIRP. The difference between EIRP of examples of FIG. 17 and EIRP of examples of FIG. 15 is relatively small compared to difference between EIRP of examples of FIG. 16 and EIRP of examples of FIG. 15. For x-axis rotation (e.g. examples of FIG. 18), the beam peak direction is aligned with the rotation axis, so the delta_EIRP difference is insignificant.

Figure 19:
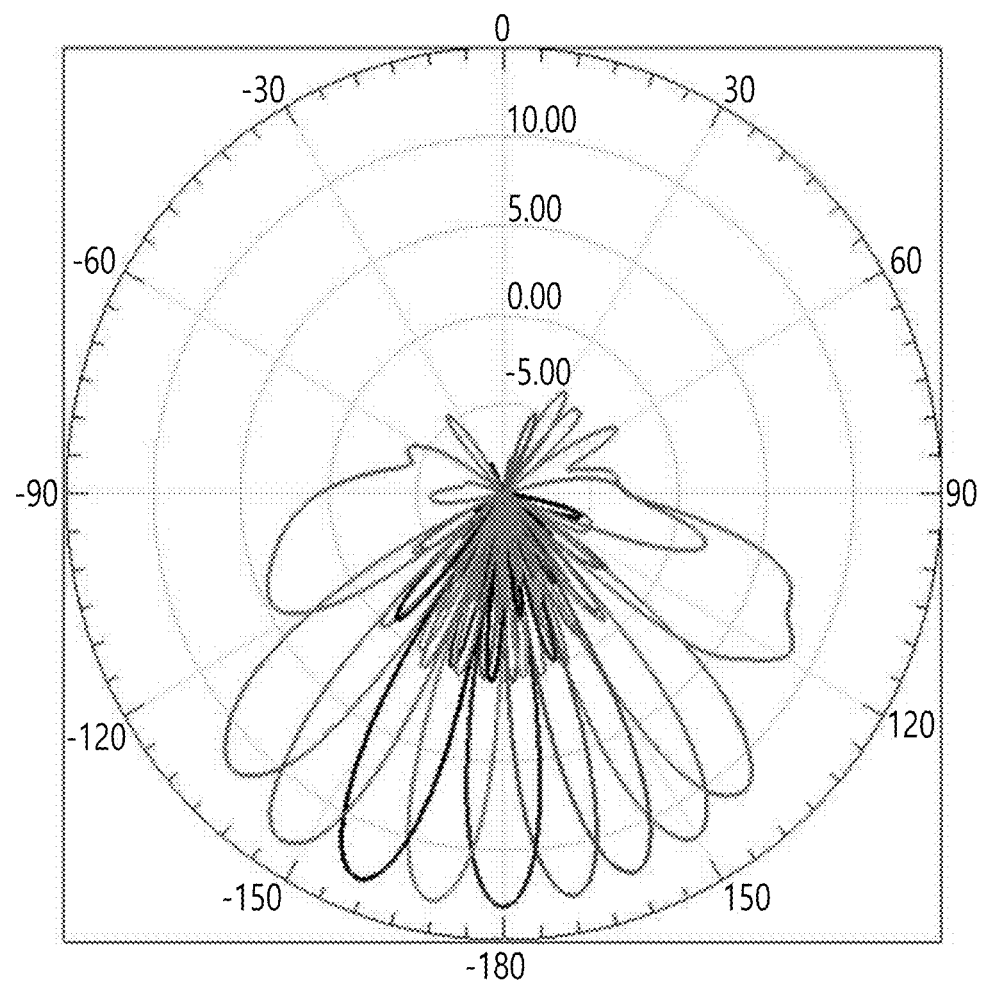
FIG. 19 shows an example of beam pattern of array antenna at frequency range around 60 GHz (e.g. frequency range including 63 GHz).

Regarding worst case (Z-axis as rotation), feasible phase error per beam should be considered. For it, each beam pattern needs to be investigated. FIG. 19 shows examples of beam pattern which is derived from implemented antenna for frequency range around 60 GHz (e.g. frequency range including 63 GHz).

The following drawings are prepared to explain a specific example of the present specification. Since the names of specific devices or names of specific signals/messages/fields described in the drawings are provided by way of example, technical features of the present specification are not limited to specific names used in the following drawings.

FIG. 19 shows an example of beam pattern of array antenna at frequency range around 60 GHz (e.g. frequency range including 63 GHz).

Based on the example of beam pattern shown in FIG. 19, if 10° is assumed as phase error per beam, beam index can be changed or the beam gain is much reduced even with same beam index so that high Delta_EIRP can occur. It may not be feasible. Therefore lower values than 10° are needed to be assumed for phase error per beam.

Figure 20A:
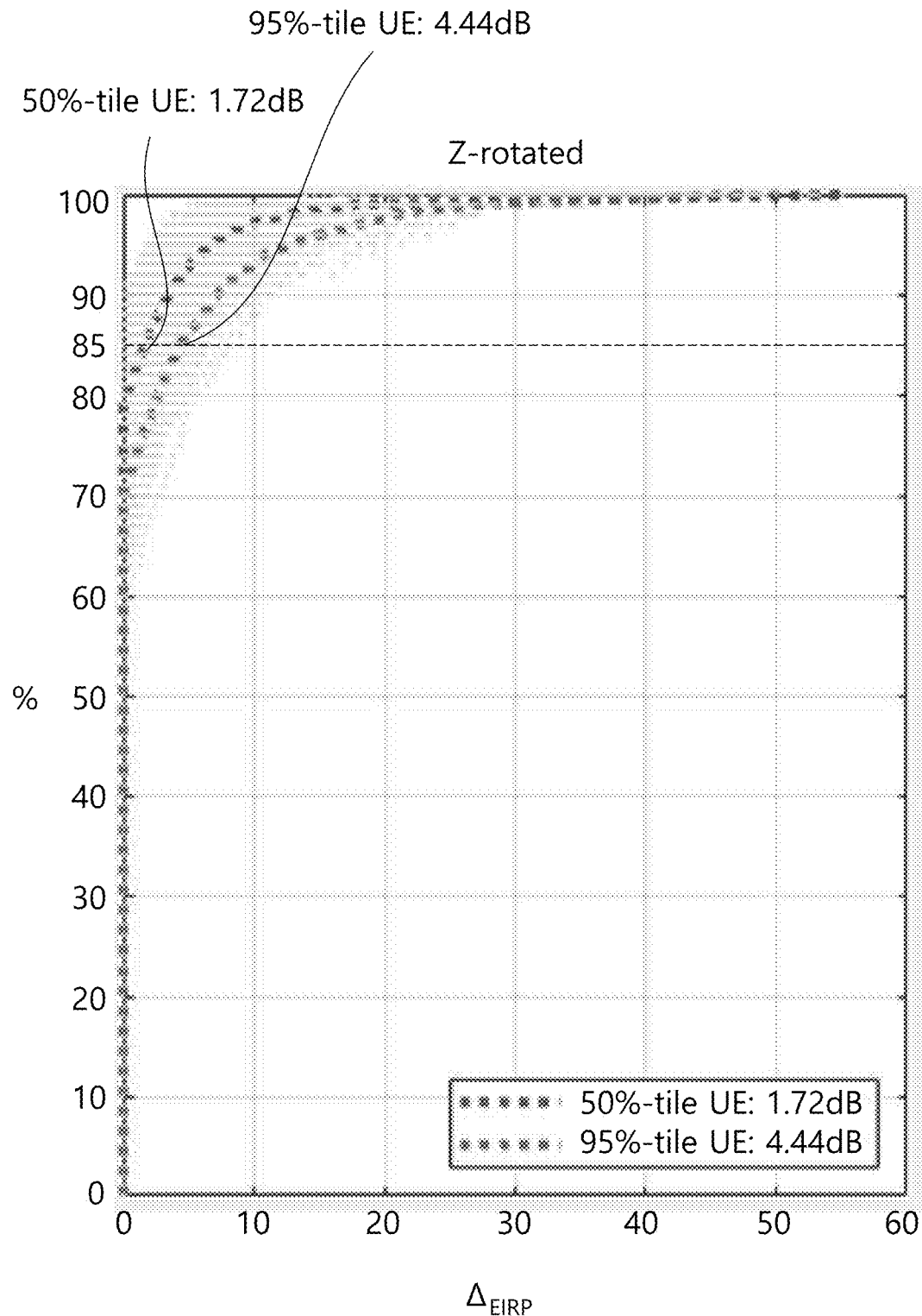
FIG. 20a to FIG. 20c shows an example of delta EIRP at frequency range around 60 GHz (e.g. frequency range including 63 GHz).
Figure 20B:
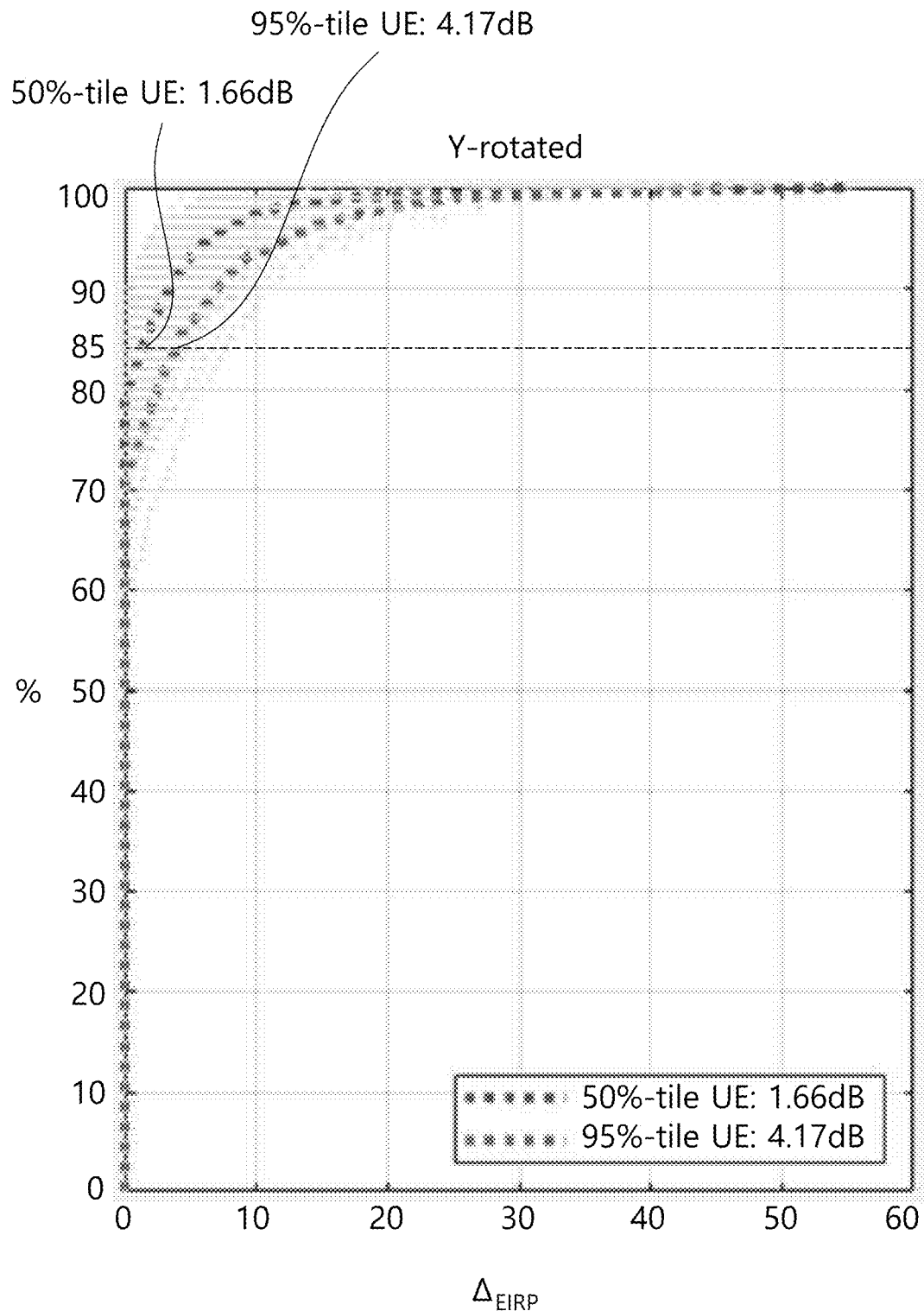
Figure 20C:
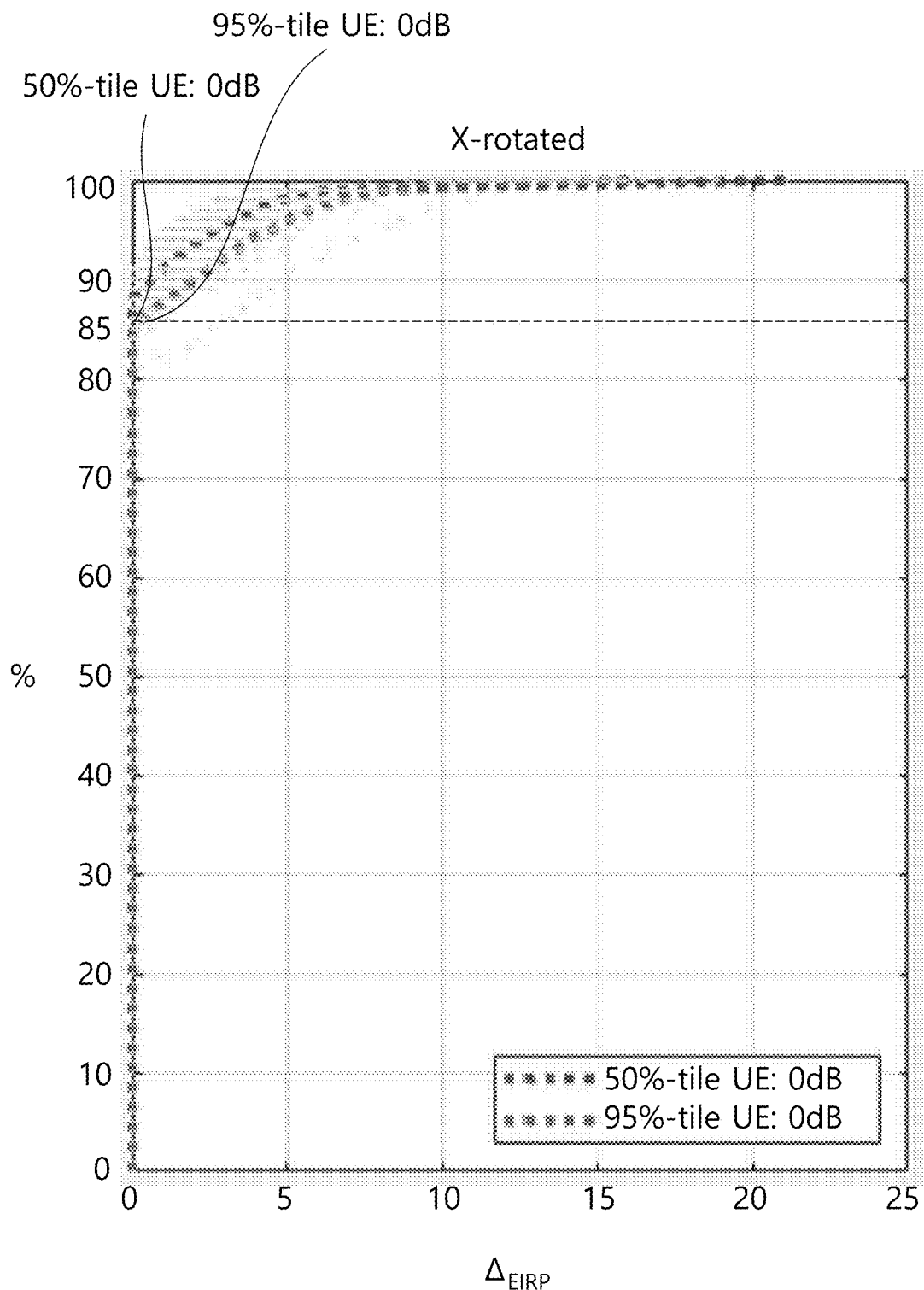

FIG. 20a to FIG. 20c shows the simulation result of delta EIRP at 85%-tile for each X, Y, Z axis based rotation of $\delta_{pk}$=5° with parameters $\delta_{ak}$=2 dB, $D_k$=2 dB in Table 15. For example, 50%-tile UE of FIG. 20a to FIG. 20c may mean line for 50%-tile of dots. Dots drawn above the line of 50%-tile UE may be 50%-tile of a total dots on the graph. For example, 95%-tile UE of FIG. 20a to FIG. 20c may mean line for 95%-tile of dots. Dots drawn above the line of 95%-tile UE may be 95%-tile of a total dots on the graph.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 20a to FIG. 20c shows an example of beam pattern of array antenna at frequency range around 60 GHz (e.g. frequency range including 63 GHz).

FIG. 20a to FIG. 20c shows example of Delta EIRP @ 85%-tile for each X, Y, Z axis based rotation of $\delta_{pk}$=5° under $\delta_{ak}$=2 dB, $D_k$=2 dB.

Figure 21A:
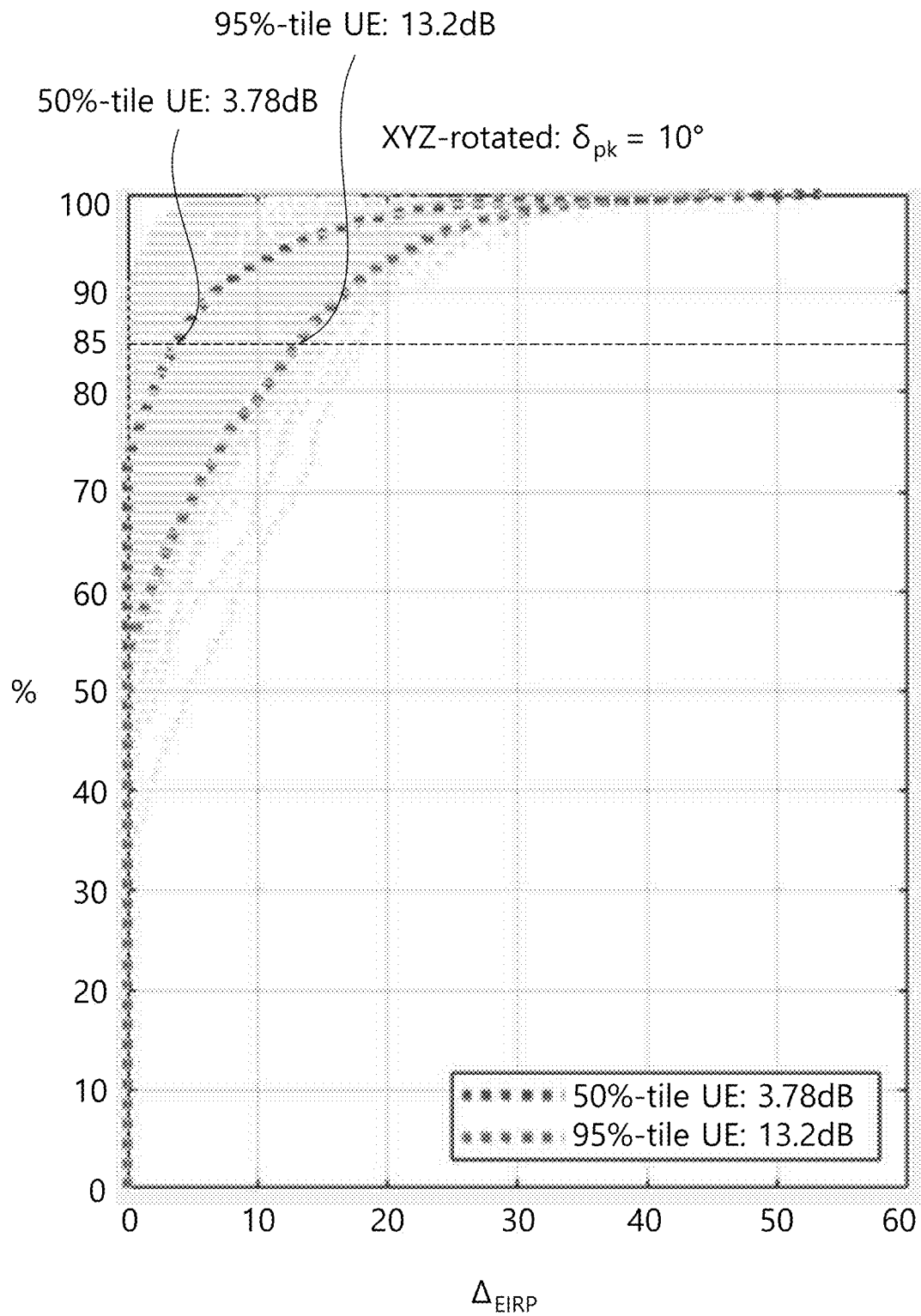
FIG. 21a to FIG. 21c shows an example of delta EIRP at frequency range around 60 GHz (e.g. frequency range including 63 GHz).
Figure 21B:
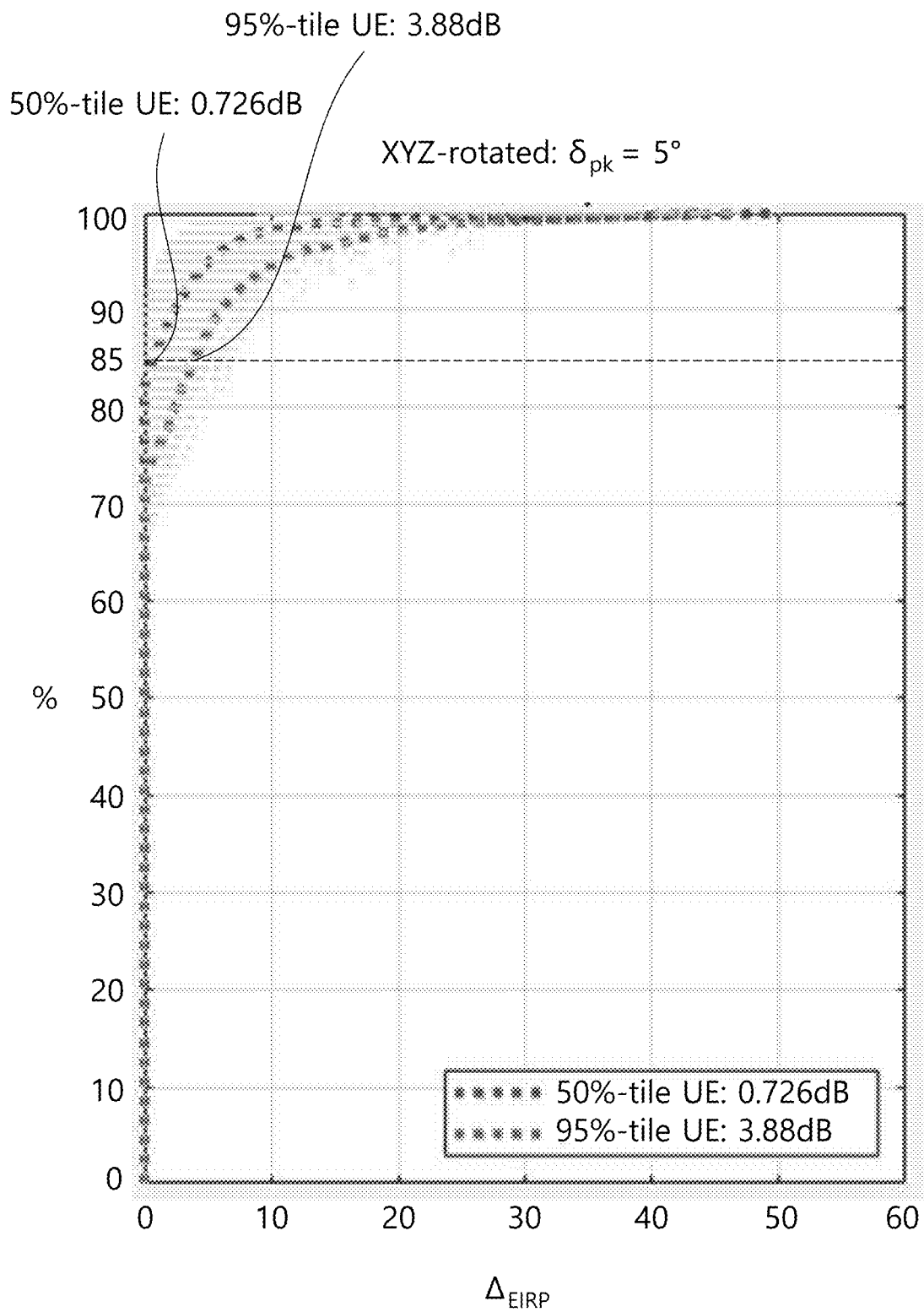
Figure 21C:
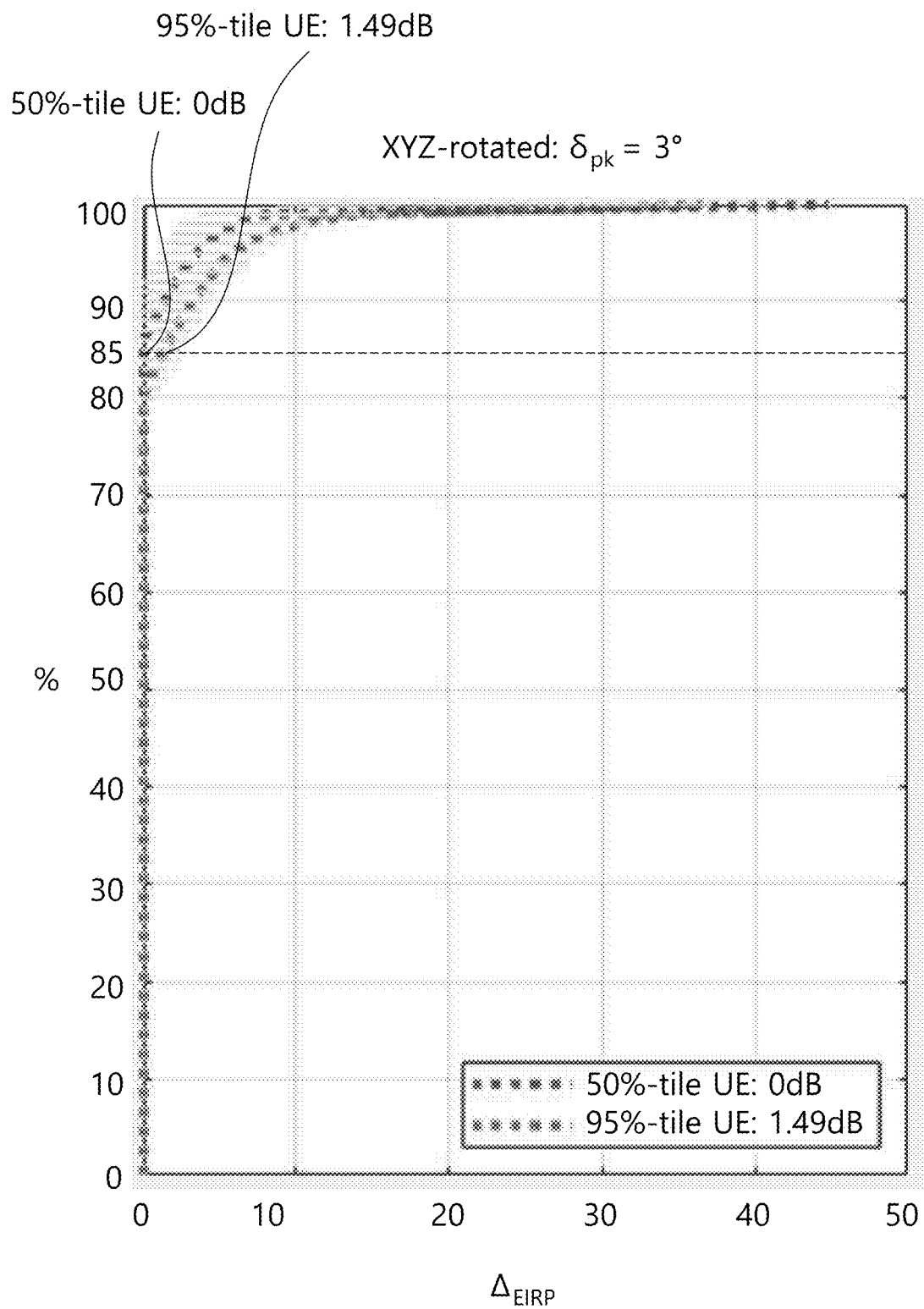

FIG. 21a to FIG. 21c shows the simulation result of delta EIRP at 85%-tile for random X/Y/Z axis based rotation of $\delta_{pk}$={10°, 5°, 3°} with parameters $\delta_{ak}$=2 dB, $D_k$=2 dB in Table 15. "random X/Y/Z axis based rotation" may mean that rotating the UE based on randomly picked one axis among X axis, Y axis and Z axis.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 21a to FIG. 21c shows an example of beam pattern of array antenna at frequency range around 60 GHz (e.g. frequency range including 63 GHz).

FIG. 21a to FIG. 21c shows example of Delta EIRP @ 85%-tile for random X/Y/Z axis based rotation of $\delta_{pk}$={10°, 5°, 3°} under $\delta_{ak}$=2 dB, $D_k$=2 dB in Table 15. For example, 50%-tile UE of FIG. 21a to FIG. 21c may mean line for 50%-tile of dots. Dots drawn above the line of 50%-tile UE may be 50%-tile of a total dots on the graph. For example, 95%-tile UE of FIG. 21a to FIG. 21c may mean line for 95%-tile of dots. Dots drawn above the line of 95%-tile UE may be 95%-tile of a total dots on the graph.

The Delta EIRPs are summarized in Table 16 based on the results in FIG. 21a to FIG. 21c with random selection of X, Y, Z axis for $\delta_{pk}$.

TABLE 16

| Phase Error per Beam ($\delta_{pk}$) | Rotated Axis for $\delta_{pk}$ | Amplitude Error per Beam ($\delta_{ak}$) | Error in RSRP estimation ($D_k$) | Max $\Delta EIRP_{BC}$ at 85th %-tile $\Delta EIRP_{BC}$ CDF (dB) | |
|---|---|---|---|---|---|
| | | | | 5%-tile UE | 95%-tile UE |
| 10° | random {X/Y/Z} | 2 dB | 2 dB | 3.78 | 13.2 |
| 5° | | | | 0.73 | 3.88 |
| 3° | | | | 0 | 1.49 |

Table 16 shows examples of Summary of Delta EIRP based on random selection of X, Y, Z axis.

Regarding phase error per beam of 5° with random selection of X, Y, Z axis and 95%-tile UE, Max $\Delta EIRP_{BC}$ at 85th %-tile $\Delta EIRP_{BC}$ CDF is proposed with 4 dB±Δ, where Δ=0~2 dB. Herein, 4 dB is derived based on 85%-tile value of 95%-tile UE, which is 3.88 dB from FIG. 21b.

Hereinafter, requirement of beam correspondence tolerance based on examples of the present specification is explained.

For power class 'X' UEs, the requirement of beam correspondence tolerance is fulfilled if the UE's corresponding UL beams satisfy the maximum limit in Table 17.

TABLE 17

| Operating band | Max $\Delta EIRP_{BC}$ at 85th %-tile $\Delta EIRP_{BC}$ CDF (dB) |
|---|---|
| nxxx in around 60 GHz | 4.0 ± Δ |

NOTE 1:
The requirements in this table are verified only under normal temperature conditions as defined in Annex E.2.1 in TS38.101-2 V16.3.1.
NOTE 2:
Δ = 0~2 dB As written in Table 17, "nxxx" may mean an operating band including frequency range around 60 GHz (e.g. frequency band including 63 GHz).

Hereinafter, side condition for the requirement of beam correspondence tolerance is explained.

For example, Side condition for SSB and Side condition for CSI-RS are explained.

The beam correspondence requirements, which are explained above with examples, are only applied under the following side conditions:
    The downlink reference signals including both SSB and
        CSI-RS are provided and Type D QCL shall be main-
        tained between SSB and CSI-RS.

The reference measurement channel for beam correspondence are fulfilled according to the CSI-RS configuration in Annex A.3 in TS38.101-2 V16.3.1.

For beam correspondence, conditions for Layer 1-Reference Signal Received Power (L1-RSRP) measurements are fulfilled according to Table 18 and Table 19.

TABLE 18

| Angle of arrival | NR operating bands | Minimum SSB_RP (Note 1) dBm/$SCS_{SSB}$ $SCS_{SSB}$ = 120 kHz | SSB Ês/Iot dB |
| --- | --- | --- | --- |
| All angles | nxxx in around 60 GHz | −96.4 + Δ | ≥6 |

NOTE 1:
Values specified at the Reference point to give minimum SSB Ês/Iot, with no applied noise.
NOTE 2:
Δ = 0~6 dB Table 18 shows an example of Conditions for SSB based L1-RSRP measurements for beam correspondence. According to Table 18, "nxxx" may mean an operating band including frequency range around 60 GHz (e.g. frequency band including 63 GHz). Ês/IoT may mean Signal-to-Noise Ratio. Herein, Iot may mean received power spectral density of the total noise and interference for a certain Resource Element (RE). RP may mean Received Power.

TABLE 19

| Angle of arrival | NR operating bands | Minimum CSI-RS_RP (Note 1) dBm/$SCS_{CSI-RS}$ $SCS_{CSI-RS}$ = 120 kHz | CSI-RS Ês/Iot dB |
| --- | --- | --- | --- |
| All angles | nxxx in around 60 GHz | −96.4 + Δ | ≥6 |

NOTE 1:
Values specified at the Reference point to give minimum SSB Ês/Iot, with no applied noise.
NOTE 2:
Δ = 0~6 dB Table 19 shows an example of Conditions for CSI-RS based L1-RSRP measurements for beam correspondence. According to Table 18, "nxxx" may mean an operating band including frequency range around 60 GHz (e.g. frequency band including 63 GHz).

As shown in examples of Table 18 and Table 19, the beam correspondence requirements, which are explained above with examples, are applied when the above side conditions are satisfied.

6. Capability Signaling for Power Class 'X'

In 3GPP Technical Specification, capability signaling for power class based on FR2 may be signaled by the UE to the base station, based on the following "RF-parameters" signaling.

For example, the UE may transmit capability information related to power class of the UE, which is included in the "RF-parameters" Information Element (IE), to the base station. The IE RF-Parameters is used to convey RF-related capabilities for NR operation.

Herein, the capability information related to power class of the UE may be "ue-PowerClass" as written in an example of Table 20. Table 20 shows an example of the capability information related to power class of the UE.

TABLE 20

BandNR ::= SEQUENCE {
...
ue-PowerClass    ENUMERATED    {pc1, pc2, pc3, pc4}    OPTIONAL,
...}

According to Table 20, when the UE transmits "ue-PowerClass" to the base station, the base station may recognize power class of the UE based on ue-PowerClass. For example, "pc1" may mean that power class of the UE is power class 1.

The capability information related to power class (e.g. ue-PowerClass) may be included in IE called BandNR. BandNR may be included in the IE RF-Parameters.

However, pc 2 of the example of Table 20 may mean power class 2 UE, which is a conventionally defined power class for vehicular UE based on FR 2.

It is necessary to distinguish the power class for the vehicular UE based on frequency band around 60 GHz (e.g. frequency band including 63 GHz) and the power class of the vehicular UE (power class2 (pc2)) of the existing FR2 (24.25 GHz~52.6 GHz). To this end, based on the contents of examples of "4. Transmitter characteristics", the present specification proposes the following examples.

1) Example 1

Example 1 proposes new power class number for the vehicular UE based on frequency band around 60 GHz (e.g. frequency band including 63 GHz). For example, pc 'X' (power class 'X') is proposed. Herein, X may be positive real number such as 5, 6, 7, 8. Compared to the existing pc2, pc 'X' may have different value for at least one of the UE minimum peak EIRP, max TRP, and max EIRP UE spherical coverage (minimum EIRP at 'Y'%-tile CDF). The power class may mean {UE minimum peak EIRP, max TRP, max EIRP, UE spherical coverage (minimum EIRP at 'Y'%-tile CDF)} package.

Capability information related to power class of the UE based on Example 1 may be expressed as an example in Table 21.

TABLE 21 ue-PowerClass ENUMERATED {pc1, pc2, pc3, pc4, pc5, pc6, pc7, pc8} OPTIONAL

For example, pc 'X' (power class 'X') may be one of pc5, pc6, pc7 or pc8 in the Example of Table 21. If the UE is a vehicular UE based on frequency band around 60 GHz (e.g. frequency band including 63 GHz), the UE may transmit "ue-PowerClass" set to one of pc5, pc6, pc7 or pc8 to the base station.

2) Example 2

Example 2 proposes designating power class, pc 'X' based on {UE minimum peak EIRP, max TRP, max EIRP} instead of the package of 4 requirements (e.g. {UE minimum peak EIRP, max TRP, max EIRP, UE spherical coverage (minimum EIRP at 'Y'%-tile CDF)} package) as proposed in Example 1. Example 2 proposes a method that the UE performs signaling of UE spherical coverage (ue-PowerClass-spherical, 'Y') separately from the signaling of the power class.

For example, a vehicular UE based on frequency band around 60 GHz (e.g. frequency band including 63 GHz) may transmit Capability information related to power class of the UE including ue-PowerClass set to pc 'X' and ue-PowerClass-spherical set to 'Y'.

Capability information related to power class of the UE based on Example 2 may be expressed as an example in Table 22.

TABLE 22 ue-PowerClass ENUMERATED
{pc1, pc2, pc3, pc4, pc'X'} OPTIONAL,
ue-PowerClass-spherical ENUMERATED
{85, 60, 50, 20, 'Y'} OPTIONAL, If the UE is a vehicular UE based on frequency band around 60 GHz (e.g. frequency band including 63 GHz), the UE may transmit "ue-PowerClass" set to pc 'X' and ue-PowerClass-spherical set to 'Y' to the base station. Herein, ue-PowerClass-spherical may be set to a value one of {1, 2, . . . , 99}.

3) Example 3

Example 3 proposes designating power class, pc 'X' based on {UE type, max TRP, max EIRP} instead of the package of 4 requirements (e.g. {UE minimum peak EIRP, max TRP, max EIRP, UE spherical coverage (minimum EIRP at 'Y'%-tile CDF)} package) as proposed in Example 1. Example 3 proposes a method that the UE performs signaling of UE minimum peak EIRP(ue-PowerClass-minPeakEIRP, pe 'Z') and UE spherical coverage (ue-PowerClass-spherical, 'Y') separately from the signaling of the power class.

For example, a vehicular UE based on frequency band around 60 GHz (e.g. frequency band including 63 GHz) may transmit Capability information related to power class of the UE including ue-PowerClass set to pc 'X', ue-PowerClass-minPeakEIRP set to pe 'Z' and ue-PowerClass-spherical set to 'Y'.

Capability information related to power class of the UE based on Example 3 may be expressed as an example in Table 23.

TABLE 23 ue-PowerClass ENUMERATED
{pc1, pc2, pc3, pc4, pc'X'} OPTIONAL,
ue-PowerClass-minPeakEIRP ENUMERATED
{pe1, pe2, pe3, pe4, ...} OPTIONAL,
ue-PowerClass-spherical ENUMERATED
{85, 60, 50, 20, 'Y'} OPTIONAL, If the UE is a vehicular UE based on frequency band around 60 GHz (e.g. frequency band including 63 GHz), the UE may transmit "ue-PowerClass" set to pc 'X', ue-PowerClass-minPeakEIRP set to pe 'Z' and ue-PowerClass-spherical set to 'Y' to the base station. Herein, ue-PowerClass-spherical may be set to a value one of {1, 2, . . . , 99}.

4) Example 4

Example 4 proposes using the existing power class together with signaling (e.g. FR-range) that distinguishes FR2 (24.25 GHz~52.6 GHz) and FR 'X' (52.6~71 GHz) (FR 'X' may correspond to frequency band around 60 GHz (e.g. frequency band including 63 GHz). Herein, for example, frequency band around 60 GHz (e.g. frequency band including 63 GHz) may correspond to i) FR'3' or FR'4', or ii) FR2.1 or FR2.2. The vehicular UE based on frequency band around 60 GHz (e.g. frequency band including 63 GHz) may use pc2, which also represents the vehicular UE based on FR2, but the actual {UE minimum peak EIRP, max TRP, max EIRP, UE spherical coverage (minimum EIRP at 'Y'%-tile CDF)} package value for the pc 2, which is for the vehicular UE based on frequency band around 60 GHz (e.g. frequency band including 63 GHz) may be different from the pc2 of the vehicular UE based on FR2.

Capability information related to power class of the UE based on Example 4 may be expressed as an example in Table 24.

TABLE 24

FR-range ENUMERATED {1, 2, 3, 4} OPTIONAL,
ue-PowerClass ENUMERATED {pc1, pc2, pc3, pc4} OPTIONAL, For reference, FR-range may be "ENUMERATED {1, 2, 2.1, 2.2, 2.x, . . . }". If the UE is a vehicular UE based on frequency band around 60 GHz (e.g. frequency band including 63 GHz), the UE may transmit "FR-range" set to pc '3 or 4' or pc '2.2 or 2.x', ue-PowerClass set to pc2.

Figure 22:
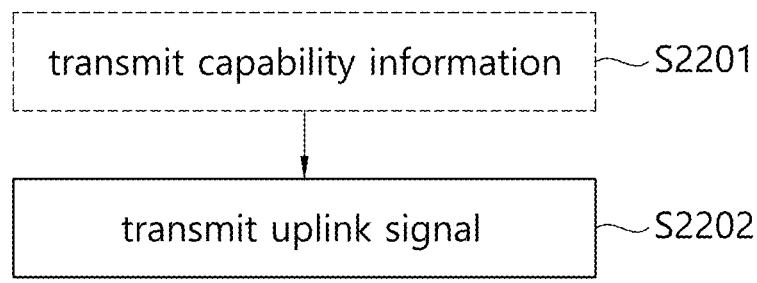
FIG. 22 is a flow chart showing an example of a procedure performed by a UE according to the present disclosure.

Hereinafter, FIG. 22 illustrates an example of an operation performed by the UE. Herein, the UE may be a vehicular UE performing communication based on an operating band including the frequency range around 60 GHz (e.g. frequency range including 63 GHz).

The following drawings are prepared to explain a specific example of the present specification. Since the names of specific devices or names of specific signals/messages/fields described in the drawings are provided by way of example, technical features of the present specification are not limited to specific names used in the following drawings.

FIG. 22 is a flow chart showing an example of a procedure performed by a UE according to the present disclosure.

Referring to FIG. 22, steps S2201 to S2202 are shown. Operations described below may be performed by the UE (for example, the first device 100 of FIG. 2 and device 100 of FIG. 3).

For reference, step S2201 may not always be performed when the UE performs communication. For example, step S2201 may be performed as a part of step S2202.

For reference, operations of UE shown in FIG. 22 are examples. That is, the scope of the present specification is not limited by the operations of the UE shown in FIG. 22. The UE may perform operations explained in the present specification even if some of the operation is not shown in the examples of FIG. 22.

In step S2201, the UE may transmit capability information to a base station. For example, the UE may transmit capability information to the base station, based on that the UE is a vehicular UE configured to use an operating band including frequency range around 60 GHz (e.g. frequency range including 63 GHz).

The capability information may be capability information explained in examples of the present specification, such as capability signaling in "4. Transmitter characteristics" of the present specification, and capability signaling in "6. Capability signaling for Power Class 'X'" of the present specification.

In step S2202, the UE may transmit uplink signal to a base station. At least one transceiver included in the UE is configured to satisfy a Radio Frequency (RF) requirement for the power class X. For example, the RF requirement for the power class X includes at least one of minimum peak EIRP, maximum output power, or spherical coverage, requirements related to beam correspondence which are explained in examples of the present specification. For example, the RF requirement may include requirements explained in "4. Transmitter characteristics" of the present specification. Also, the At least one transceiver included in the UE is configured to satisfy requirements related to beam correspondence. For example, the requirements related to beam correspondence may include requirements explained in "5. Beam correspondence" of the present specification.

According to various examples described in the disclosure of the present specification, examples of RF requirements for the frequency band around 60 GHz (e.g. 52.6 GHz~71 GHz, frequency band including 63 GHz) are explained. For example, in various examples described in the disclosure of the present specification, the overview of ITS at frequency band around 60 GHz (e.g. 63 GHz), regulation on frequency band around 60 GHz (e.g. 63 GHz), Link budget frequency band around 60 GHz (e.g. 63 GHz), Transmitter characteristics, Beam correspondence, Capability signaling for Power Class 'X' are explained. For example, according to various examples described in the disclosure of the present specification, RF requirements for transmission (e g minimum peak EIRP, UE maximum output power limits, UE spherical coverage, requirements for beam correspondence, etc.) based on the frequency band around 60 GHz (e.g. frequency band including 63 GHz) are explained. For example, according to various examples described in the disclosure of the present specification, examples of capability signaling for a vehicular UE performing communication based on the frequency band around 60 GHz (e.g. frequency band including 63 GHz) are explained.

Hereinafter, an apparatus (for example, UE) in a wireless communication system, according to some embodiments of the present disclosure, will be described.

For example, the apparatus may include at least one processor, at least one transceiver, and at least one transceiver; at least one processor; and at least one computer memory operably connectable to the at least one processor and storing instructions that, based on being executed by the at least one processor, perform operations comprising: transmitting uplink signal to a base station, wherein power class of the UE is power class X, based on that the UE is a vehicular UE configured to use an operating band including frequency range around 60 GHz, wherein the at least one transceiver is configured to satisfy a Radio Frequency (RF) requirement for the power class X, and wherein the RF requirement for the power class X includes at least one of minimum peak Effective Isotropic Radiated Power (EIRP), maximum output power, or spherical coverage.

Hereinafter, a wireless device operating in a wireless communication system, according to some embodiments of the present disclosure, will be described.

For example, the wireless device may include at least one processor, at least one transceiver, and at least one transceiver; at least one processor; and at least one computer memory operably connectable to the at least one processor and storing instructions that, based on being executed by the at least one processor, perform operations comprising: transmitting uplink signal to a base station, wherein power class of the UE is power class X, based on that the UE is a vehicular UE configured to use an operating band including frequency range around 60 GHz, wherein the at least one transceiver is configured to satisfy a Radio Frequency (RF) requirement for the power class X, and wherein the RF requirement for the power class X includes at least one of minimum peak Effective Isotropic Radiated Power (EIRP), maximum output power, or spherical coverage.

Hereinafter, a non-transitory computer-readable medium (CRM) has stored thereon a plurality of instructions in a wireless communication system, according to some embodiments of the present disclosure, will be described.

Hereinafter, At least one computer readable medium (CRM) storing instructions will be described.

For example, a plurality of instruction, based on being executed by at least one processor, perform operations comprising: generating uplink signal, wherein power class of a device including the at least one processor is power class X, based on that the device is a vehicular device configured to use an operating band including frequency range around 60 GHz, wherein the at least one transceiver is configured to satisfy a Radio Frequency (RF) requirement for the power class X, and wherein the RF requirement for the power class X includes at least one of minimum peak Effective Isotropic Radiated Power (EIRP), maximum output power, or spherical coverage.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a UE.

For example, the stored a plurality of instructions may cause the UE to generate uplink signal, wherein power class of the UE is power class X, based on that the UE is a vehicular UE configured to use an operating band including frequency range around 60 GHz, wherein the at least one transceiver is configured to satisfy a Radio Frequency (RF) requirement for the power class X, and wherein the RF requirement for the power class X includes at least one of minimum peak Effective Isotropic Radiated Power (EIRP), maximum output power, or spherical coverage.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A User Equipment (UE) comprising:
    at least one transceiver;
    at least one processor; and
    at least one computer memory operably connectable to the at least one processor and storing instructions that, based on being executed by the at least one processor, perform operations comprising:
    transmitting an uplink signal to a base station,
    wherein a power class of the UE is a power class X based on the UE being a vehicular UE,
    wherein the UE is designed to operate in an operating band of 57 GHz to 71 GHz in a frequency range 2 (FR2),
    wherein the UE is configured to satisfy a Radio Frequency (RF) requirement for the power class X,
    wherein the RF requirement for the power class X includes at least one of minimum peak Effective Isotropic Radiated Power (EIRP), maximum output power, or spherical coverage,
    wherein the spherical coverage includes minimum EIRP value at $60^{th}$ percentile of cumulative distribution function (CDF) is equal to $21\pm\Delta$ dBm, and
    wherein $\Delta$ is a real number with a range of 0 dB to 2 dB.

2. The UE of claim 1,
    wherein the maximum output power includes maximum Total Radiated Power (TRP) of 23 dBm, and maximum EIRP of 43 dBm.

3. The UE of claim 1,
    wherein the minimum peak EIRP is equal to $32\pm\Delta$ dBm, and
    wherein $\Delta$ is a real number with a range of 0 dB to 2 dB.

4. The UE of claim 1,
    wherein the minimum peak EIRP is equal to $20.5\pm\Delta$ dBm, and
    wherein $\Delta$ is a real number with a range of 0 dB to 5.5 dB.

5. The UE of claim 1,
    wherein the spherical coverage includes minimum EIRP value at $60^{th}$ percentile of cumulative distribution function (CDF) is equal to $9.5\pm\Delta$ dBm, and
    wherein $\Delta$ is a real number with a range of 0 dB to 5.5 dB.

6. The UE of claim 1,
    wherein the RF requirement further includes beam correspondence tolerance for the power class X.

7. The UE of claim 6,
    wherein the beam correspondence tolerance is based on maximum value of delta EIRP, which is equal to $EIRP_2 - EIRP_1$,
    wherein $EIRP_1$ is a total EIRP calculated based on a beam the UE chose to transmit signal in the direction of the incoming downlink signal based on a beam correspondence,
    wherein $EIRP_2$ is a best total EIRP based on a beam correspondence,
    wherein the maximum value of delta EIRP is $4.0\pm\Delta$ dBm for the power class X, and
    wherein $\Delta$ is a real number with a range of 0 dB to 2 dB.

8. The UE of claim 1, the operations further comprising:
    transmitting capability information related to the power class X to the base station.

9. The UE of claim 1,
    wherein the UE is an autonomous driving device communicating with at least one of a mobile terminal, a network and an autonomous vehicle other than the UE.

10. A method comprising:
    transmitting an uplink signal to a base station,
    wherein a power class of a User Equipment (UE) is a power class X based on the UE being a vehicular UE,
    wherein the UE is designed to operate in an operating band of 57 GHz to 71 GHz in a frequency range 2 (FR2),
    wherein the UE is configured to satisfy a Radio Frequency (RF) requirement for the power class X,
    wherein the RF requirement for the power class X includes at least one of minimum peak Effective Isotropic Radiated Power (EIRP), maximum output power, or spherical coverage,
    wherein the spherical coverage includes minimum EIRP value at $60^{th}$ percentile of cumulative distribution function (CDF) is equal to $21\pm\Delta$ dBm, and
    wherein $\Delta$ is a real number with a range of 0 dB to 2 dB.

11. A processing apparatus, configured to control a User Equipment (UE), comprising:
    at least one processor; and
    at least one computer memory operably connectable to the at least one processor,
    wherein the at least one processor is configured to perform operations comprising:
    generating an uplink signal,
    wherein a power class of the UE is a power class X based on the UE being a vehicular UE,
    wherein the UE is designed to operate in an operating band of 57 GHz to 71 GHz in a frequency range of 2 (FR2),
    wherein the UE is configured to satisfy a Radio Frequency (RF) requirement for the power class X,
    wherein the RF requirement for the power class X includes at least one of minimum peak Effective Isotropic Radiated Power (EIRP), maximum output power, or spherical coverage,
    wherein the spherical coverage includes minimum EIRP value at $60^{th}$ percentile of cumulative distribution function (CDF) is equal to $21\pm\Delta$ dBm, and
    wherein $\Delta$ is a real number with a range of 0 dB to 2 dB.

* * * * *